(12) United States Patent
Shimada et al.

(10) Patent No.: US 6,672,509 B2
(45) Date of Patent: Jan. 6, 2004

(54) LIBRARY APPARATUS AND METHOD FOR READING MARKERS ON RECORDING MEDIA THEREIN

(75) Inventors: Hiroshi Shimada, Akashi (JP); Noriaki Matsuzaki, Himeji (JP); Takahiro Asahara, Himeji (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/152,582

(22) Filed: May 23, 2002

(65) Prior Publication Data

US 2002/0145034 A1 Oct. 10, 2002

Related U.S. Application Data

(63) Continuation of application No. PCT/JP99/06559, filed on Nov. 25, 1999.

(51) Int. Cl.[7] ................................................. G06K 7/10
(52) U.S. Cl. ................................................. 235/462.01
(58) Field of Search ........................ 235/462.01, 462.1, 235/462.12, 462.07, 462.08; 360/90, 92; 901/46, 47

(56) References Cited

U.S. PATENT DOCUMENTS

| | | | | |
|---|---|---|---|---|
| 3,959,624 A | * | 5/1976 | Kaslow | 235/487 |
| 4,963,719 A | * | 10/1990 | Brooks et al. | 219/686 |
| 5,128,527 A | * | 7/1992 | Kawai et al. | 235/462.07 |
| 5,198,649 A | * | 3/1993 | Brooks | 235/462.12 |
| 5,303,214 A | * | 4/1994 | Kulakowski et al. | 235/385 |
| 5,703,843 A | * | 12/1997 | Katsuyama et al. | 312/9.31 |
| 5,979,762 A | * | 11/1999 | Bianco | 235/462.01 |
| 6,005,734 A | * | 12/1999 | Shimada et al. | 360/69 |
| 6,016,291 A | * | 1/2000 | Joos | 369/30.43 |
| 6,138,909 A | * | 10/2000 | Rockwell et al. | 235/383 |

FOREIGN PATENT DOCUMENTS

| | | |
|---|---|---|
| JP | 59-213061 | 12/1984 |
| JP | 60-209966 | 10/1985 |
| JP | 10-228753 | 8/1998 |

* cited by examiner

*Primary Examiner*—Diane I. Lee
(74) *Attorney, Agent, or Firm*—Westerman, Hattori, Daniels & Adrian, LLP

(57) ABSTRACT

The present invention relates to a library apparatus for accommodating different types of recording medium, such as magnetic tapes, in combination. By a method for reading markers, in which the type of the recording medium and its volume label are recorded, by moving a reader, and a construction for sorting and accommodating the different types of recording medium, the markers can be read at a high speed.

5 Claims, 25 Drawing Sheets

| data at first reading | data at second reading | data at third reading | confirmed data |
|---|---|---|---|
| no data | no data | no data | no label |
| | | only standard data | only standard label |
| | | only extended data | only extended label |
| | | extended and standard data | extended + standard label |
| | only standard data | no data | only standard label |
| | | only standard data | only standard label |
| | | only extended data | extended + standard label |
| | | extended and standard data | extended + standard label |
| | only extended data | no data | only extended label |
| | | only standard data | extended + standard label |
| | | only extended data | only extended label |
| | | extended and standard data | extended + standard label |
| | extended + standard data | | extended + standard label |

Fig.18

| data at first reading | data at second reading | data at third reading | confirmed data |
|---|---|---|---|
| standard data | no data | no data | only standard label |
| | | only standard data | only standard label |
| | | only extended data | extended + standard label |
| | | extended and standard data | extended + standard label |
| | only standard data | no data | only standard label |
| | | only standard data | only standard label |
| | | only extended data | extended + standard label |
| | only extended data | extended + standard data | extended + standard label |
| | extended + standard data | | extended + standard label |

Fig. 19

| data at first reading | data at second reading | data at third reading | confirmed data |
|---|---|---|---|
| 拡張ラベル | no data | no data | only extended label |
| | | only standard data | extended + standard label |
| | | only extended data | only extended label |
| | | extended and standard data | extended + standard label |
| | only standard data | | extended + standard label |
| | only extended data | no data | only extended label |
| | | only standard data | extended + standard label |
| | | only extended data | only extended label |
| | | extended and standard data | extended + standard label |
| | extended + standard data | | extended + standard label |

Fig.20

| data at first reading | data at second reading | data at third reading | confirmed data |
|---|---|---|---|
| no data | no data | no data | no label |
| | | standard data | standard label |
| | standard data | | standard label |
| standard data | | | standard label |

Fig.23

LIBRARY APPARATUS AND METHOD FOR READING MARKERS ON RECORDING MEDIA THEREIN

This application is a continuation of International Application PCT/JP99/06559 filed Nov. 25, 1999.

BACKGROUND OF THE INVENTION

1. Field of the Invention

The present invention relates to a library apparatus for accommodating a plurality of types of recording medium. More specifically, the present invention relates to a library apparatus having a construction for reading markers on recording media at high speed and a method for reading the markers.

2. Description of Related Art

A library apparatus is essential for various information processing systems which are capable of storing and processing vast quantities of data. The vast quantities of data are stored in many recording media such as magnetic tapes, which are accommodated in a library apparatus.

Each of the magnetic tapes is used by accommodating it in a cartridge: hereinafter, the cartridge accommodating a magnetic tape will be just referred to as a cartridge. The cartridges are individually accommodated in a cell of a cabinet in the library apparatus. Writing/reading of data is performed for a corresponding magnetic tape cartridge among many magnetic tape cartridges, on the basis of read/write commands from a host device.

More specifically, a cell which accommodates the corresponding cartridge is specified in the library apparatus based on the command from the host device. Then, the cartridge accommodated in this cell is conveyed to a recording/reproducing device in the library apparatus by a conveyor known as an accessor having a holding function for grabbing and holding a cartridge and a conveying function, the cartridge is loaded therein, and then reading/writing of data is performed from/to the magnetic tape.

Herein, each cartridge accommodated in the library apparatus corresponds to the position of each cell for accommodating the cartridge, and thus there is no need to search for a corresponding cartridge every read/write processing.

The correspondence between the cartridge and the cell is performed in the following way. A barcode label, on which volume label information such as a serial number is recorded, is attached to each cartridge. This barcode label is read by a reader mounted in the accessor when each cartridge is accommodated in the library apparatus. The reading is performed in the following way: the reader radiates reading light onto the label so as to scan it, receives reflection light generated by modulation by the barcode, and the reflection light is transformed to an electrical signal for signal processing.

The reading is performed when the movement of the reader is stopped. When the reader fails to read the barcode, it moves again to change the scanning position of the reading light so as to read the barcode. In this way, the reader repeatedly reads the barcode, the cartridge is accommodated in an empty cell after the reader obtains correct barcode data, the cell is associated with a volume label, and the correspondence relationship is transmitted to the host device. After that, the host device transmits a command including information of a cell to be accessed to the library apparatus, and then the accessor accesses the cartridge in the cell.

In this way, the volume label of the cartridge is read when the cartridge is accommodated in the library apparatus (hereinafter, "a cartridge is inserted" means a cartridge is accommodated in the library apparatus and "a cartridge is ejected" means a cartridge is taken out from the library). Even when a large number of cartridges are inserted at one time, the volume label of each cartridge preferably should be read quickly and accurately.

On the other hand, the quantity of data processed in information processing devices has become larger and larger and the storage capacity of various recording media has become larger. In magnetic tapes, 128-track magnetic tapes are becoming more common than conventional 36-track magnetic tapes in order to increase the storage capacity. A 128-track magnetic tape can be accommodated in a cartridge whose shape is substantially the same as that for a 36-track magnetic tape.

The storage capacity of the library apparatus increases by using 128-track magnetic tapes. However, cost and time are required to transfer the data stored in conventional 36-track magnetic tapes to 128-track magnetic tapes.

Accordingly, a library apparatus in which 36-track magnetic tapes can continue to be used and 128-track magnetic tapes can be used in combination with the 36-track magnetic tapes has been desired.

On the other hand, as the types of magnetic tape increase, information for distinguishing the types is required as well as the volume label. Accordingly, the amount of identification information recorded on a cartridge label increases. Read errors will be more likely to occur as the identification information increases. Therefore, a method for enabling higher-speed reading is desired so as to shorten the time for read processing even when a read error occurs.

SUMMARY OF THE INVENTION

It is an object of the present invention to provide a library apparatus in which the above-described different types of magnetic tape can be used in combination. Further, it is an object of the present invention to provide a method for reading markers on the different types of magnetic tape, that is, a method for reading the type of the magnetic tape and its volume label.

Reading processing takes time because rereading is performed when a read error occurs and because a reader is started from a stop mode for reading the barcode label of the next cartridge. Accordingly, in the present invention, markers such as various labels attached on a recording medium such as a magnetic tape are read by a moving reader. When the read data includes the data of all types of marker, it is determined that the markers are accurately read. When the data does not include the data of all types of markers, reading is continued. With this arrangement, retry processing can be performed by moving the reader without restarting it from the stop mode.

Also, in the present invention, the above-described reading is performed when the recording medium is accommodated in the library apparatus. With this arrangement, reading of the markers can be performed in a short time even when a large number of recording media are accommodated.

Further, in the present invention, means for setting the type of the recording medium is provided in an accommodation unit for accommodating the recording medium in the library apparatus. With this arrangement, the type of the recording medium is clear when reading of the markers on the recording medium is performed in advance, and thus preferable retry processing for each recording medium can be performed and reading of the markers can be performed in a short time.

BRIEF DESCRIPTION OF THE DRAWINGS

FIG. 18 shows the correspondence between the read data from the barcode label and the confirmation data in the library apparatus according to the present invention and shows the case where no data is read at the first reading.

FIG. 19 shows the correspondence between the read data from the barcode label and the confirmation data and shows the case where only the data of the standard barcode label is read at the first reading.

FIG. 20 shows the correspondence between the read data from the barcode label and the confirmation data and shows the case where only the data of the extended barcode label is read at the first reading.

FIG. 23 shows the correspondence between the read data and the confirmation data at the reading of a line of the rotary drum in which the 36-track magnetic tape cartridge is accommodated when the rotary drum shown in FIG. 21 is used.

DETAILED DESCRIPTION OF THE PREFERRED EMBODIMENT

Hereinafter, embodiments of the present invention will be described with reference to the accompanying drawings.

Figure 1:
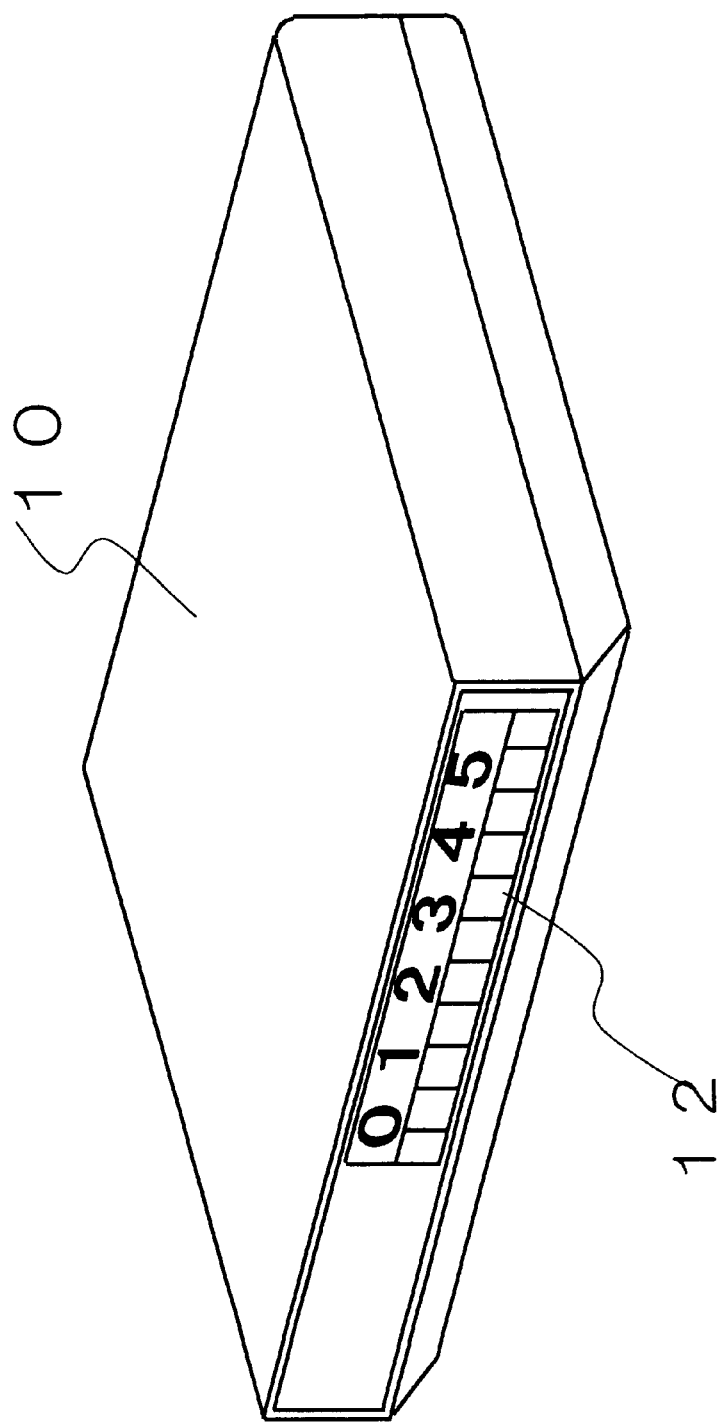
FIG. 1 schematically shows a 36-track magnetic tape cartridge to be accommodated in a library apparatus according to the present invention.

First, cartridges used in the embodiments will be described with reference to FIGS. 1 and 2. FIG. 1 shows a 36-track cartridge 10 which accommodates a conventional 36-track magnetic tape having 36 recording tracks. A standard barcode label 12, on which a volume label such as a serial number for identifying the 36-track cartridge 10 is recorded with a barcode, is attached to a side surface of the 36-track cartridge 10.

Figure 2:
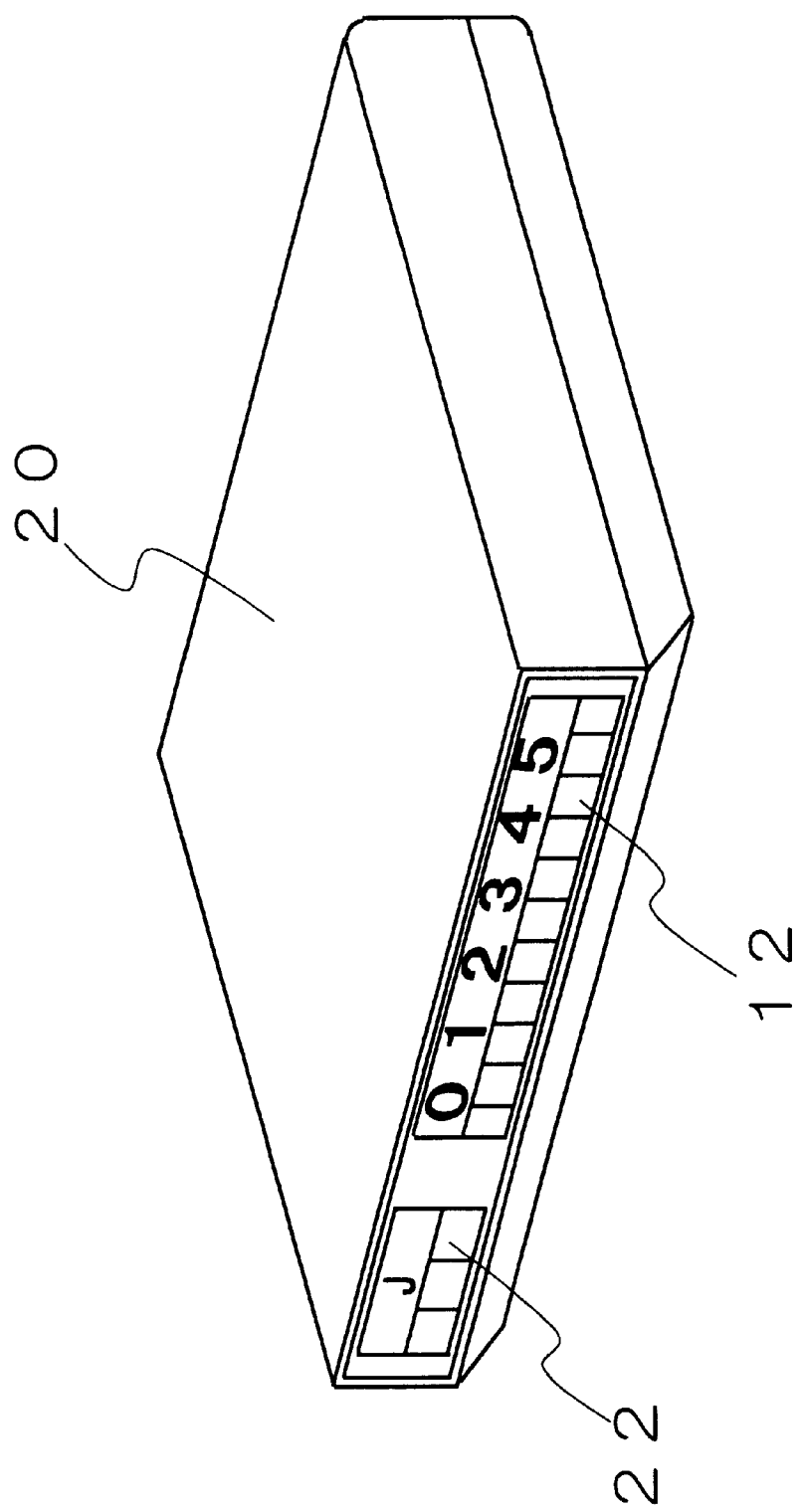
FIG. 2 schematically shows a 128-track magnetic tape cartridge to be accommodated in the library apparatus according to the present invention.

FIG. 2 shows a 128-track cartridge 20 used in the embodiments according to the present invention. The standard barcode label 12, on which a volume label such as a serial number is recorded with a barcode, is attached to a side surface of the 128-track cartridge 20, as in the 36-track cartridge 10. Further, an extended barcode label 22 for indicating the type of cartridge is attached to the side surface to which the standard barcode label 12 is attached, so as to distinguish it from the 36-track cartridge 10. This extended barcode label 22 is not required to be attached in the library apparatus in which only 128-track cartridges 20 are used, and is peculiar to the embodiments according to the present invention.

In the embodiments, the case where two types of cartridge are used is described, but these cartridges can be distinguished one from another by the above-described method. Now, problems which may occur when the 36-track cartridge 10 and the 128-track cartridge 20 are used in combination are described below.

That is, it is not possible to distinguish between the case where the standard barcode label 12 on the 36-track cartridge 10 is read without error and the case where the extended barcode label 22 on the 128-track cartridge 20 is not read and only the standard barcode label 12 thereon is read.

In this case, when the barcode label on the 36-track cartridge 10 is accurately read and when the extended barcode label 22 on the 128-track cartridge 20 cannot be read, the reading operation needs time if retry processing, as in the known art, is performed, that is, reread processing is performed by moving a barcode reader in the vertical direction. Furthermore, the number of retry processings increases as the number of 36-track cartridges 10 increases. As a result, the reading operation time will become longer, which is disadvantageous.

Accordingly, the following measures can be taken to overcome these problems.

(1) Speeding up the read processing because the number of retries increases when different types of magnetic tape cartridge are used.

(2) Even when different types of magnetic tape cartridge are used in combination, the cartridges can be identified by means other than a label thereby achieving a construction where the number of retries does not increase.

A first embodiment described below in detail is based on the concept (1) and a second embodiment and the subsequent embodiments are based on the concept (2).

(First Embodiment)

Figure 3:
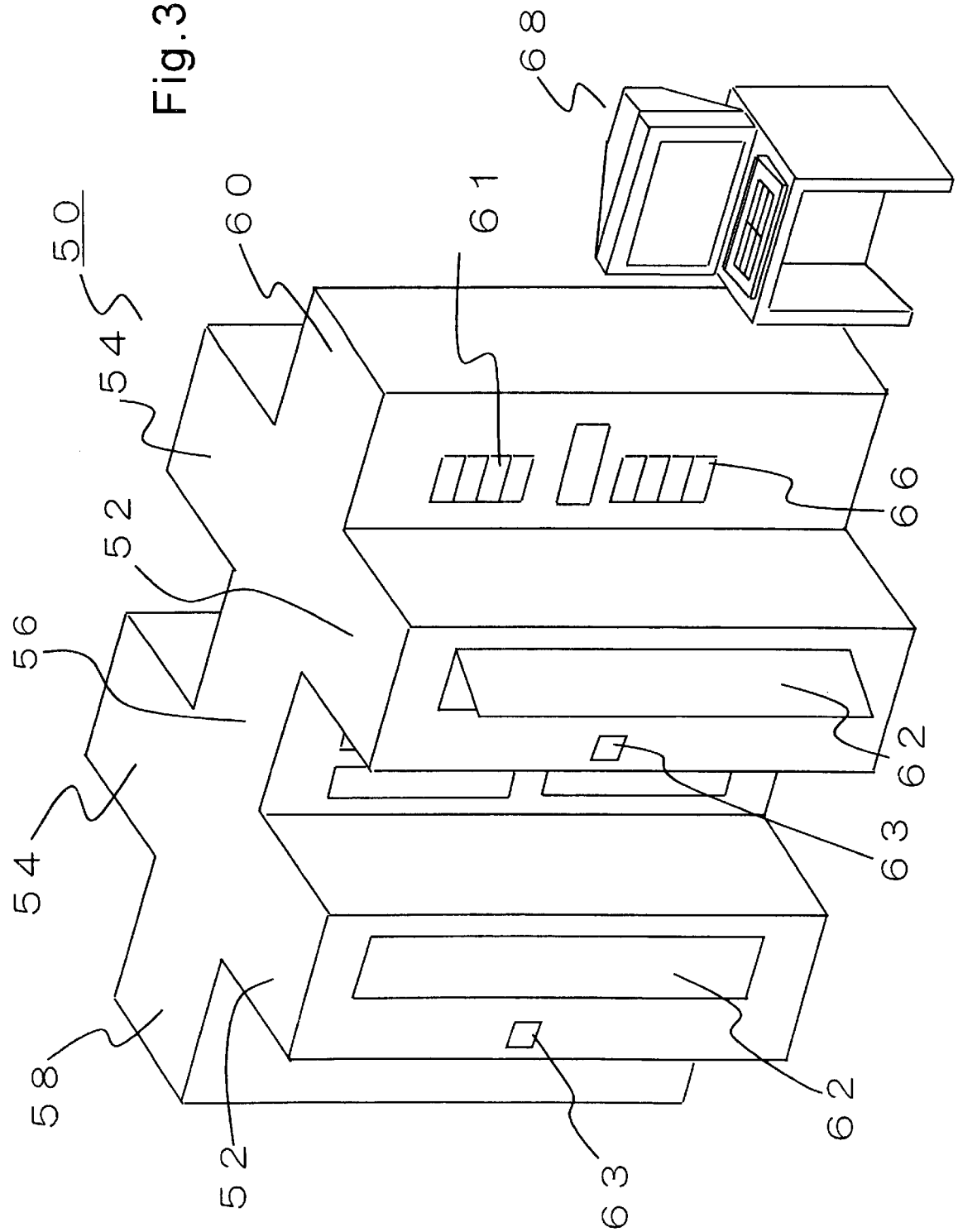
FIG. 3 is a schematic view showing the library apparatus according to the present invention.

FIG. 3 schematically shows a library apparatus according to the first embodiment of the present invention, in which the above-described 36-track cartridges 10 and the 128-track cartridges 20 can be accommodated and used in combination. The library apparatus 50 is roughly composed of three types of frame.

A first frame includes DEE drum frames 52 and drum frames 54. Each of these frames accommodates a heptangular-prism rotary drum in this embodiment and each face of the drum is provided with many cells which serve as container for accommodating a cartridge.

Each of the DEE drum frames 52 is provided with a door 62 and a DEE operator panel 63. The door can be opened so as to directly insert a cartridge to a drum, which will be described later, or to take out the cartridge from the drum from the outside of the apparatus. That is, the DEE drum frame 52 has a direct entry/exit function (hereinafter referred to as DEE: DEE stands for direct entry/exit), and can be used to insert many cartridges to the library apparatus 50 and eject the cartridges therefrom.

On the other hand, each of the drum frames 54 has a rotary drum, as in the DEE drum frames 52. However, its main purpose is to accommodate many cartridges, and the cartridges are not directly inserted to and ejected from the drum frames 54.

A second frame includes an MTU frame 56 (MTU stands for magnetic tape unit) provided between the DEE drum frames 52 and the drum frames 54. The MTU frame 56 is provided with a plurality of magnetic tape recording devices and writing/reading of data is performed to/from loaded magnetic tapes.

A third frame includes garage frames 58 and 60 provided at both ends of the library apparatus 50. Each of the garage frames 58 and 60 has many cells on its wall and has a space for parking an accessor functioning as a conveyor robot for conveying the cartridges. Further, the garage frame 60 is provided with a CAS entry 61 which is an entry port for inserting a small number of cartridges and a CAS exit 66 which is an exit port. CAS stands for cartridge access station.

The library apparatus 50 has a console 68 at which an operator performs various operations on the library apparatus 50, as well as the three types of frame. Instructions for inserting/ejecting a cartridge can be given to the library apparatus 50 by using the console 68.

Figure 4:
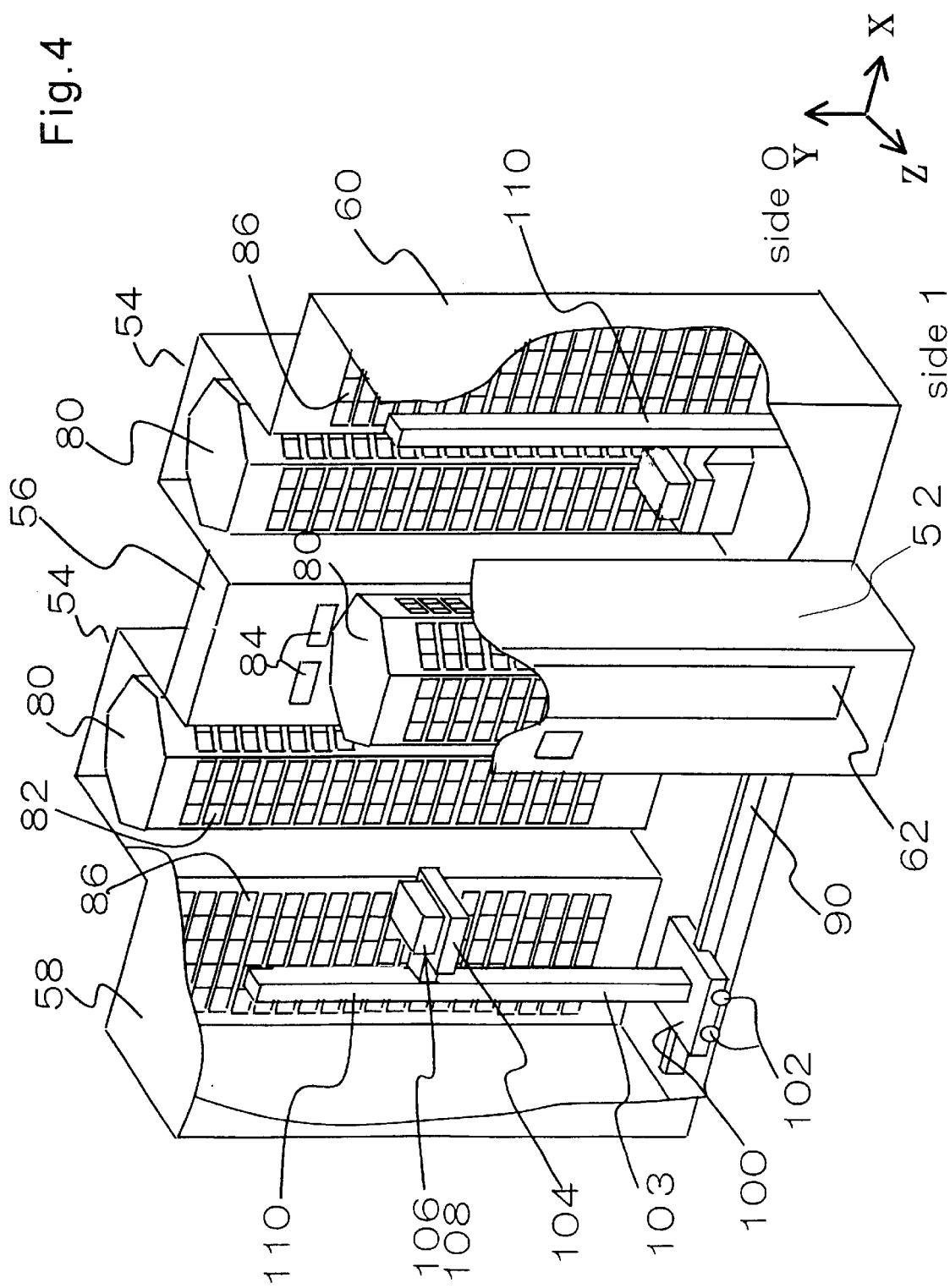
FIG. 4 is a schematic view showing the inside of the library apparatus shown in FIG. 3.

Next, the internal construction of the library apparatus 50 will be described in detail with reference to FIG. 4. FIG. 4 shows the inside of the library apparatus 50 viewed from the same direction of FIG. 2, and the console 68 is not shown.

Each of the drum frames 54 and the DEE drum frames 52 accommodates a drum 80. The rotation of the drum 80 is controlled by an electric motor so that a desired face of the drum 80 faces the front, as shown in the figure. The drum 80 has seven faces in this embodiment and each face has many cells 82.

In the MTU frame 56 placed between the two drum frames 54, a plurality of the magnetic tape recording devices 84 are provided. In this embodiment, eight magnetic tape recording devices 84 are provided.

As shown in FIG. 4, each of the garage frames 58 and 60 accommodates an accessor 110, one accessor being moved and the other accessor being stopped, respectively. Many cells 86 are provided on the wall of each of the garage frames 58 and 60.

In this embodiment, two accessors 110 are used, each accessor conveys the cartridges accommodated in the cells 82 and 86 in the library apparatus 50. The reasons for this are as follows. The conveyor efficiency can be enhanced by using two accessors 110. Also, when one of the accessors breaks down, the cartridges can be conveyed by the other accessor and thus the reliability of the library apparatus 50 can be increased.

Each of the accessors 110 has a base 100 at its lower end and is controlled to move by a specified distance on a rail 90 laid along the bottom of the library apparatus 50 by rotating rollers 102 provided on the side edges of the base. The base 100 is provided with a column 103 which has an elevator mechanism therein. Accordingly, a carriage 104 having a barcode reader 106 and a holding mechanism 108 on board can be moved in the vertical direction. The holding mechanism 108 is a mechanism for grabbing and holding the cartridge.

The position of the accessor 110 and the carriage 104 is designated in a coordinate system XYZ shown in FIG. 4. The direction X is a direction along the rail 90 and the direction Y is the vertical direction. The direction Z is the direction orthogonal to the rail 90. In particular, the face of the garage frame 58 on which cells are placed is called the 0-side and the opposite face is called the 1-side.

Figure 5:
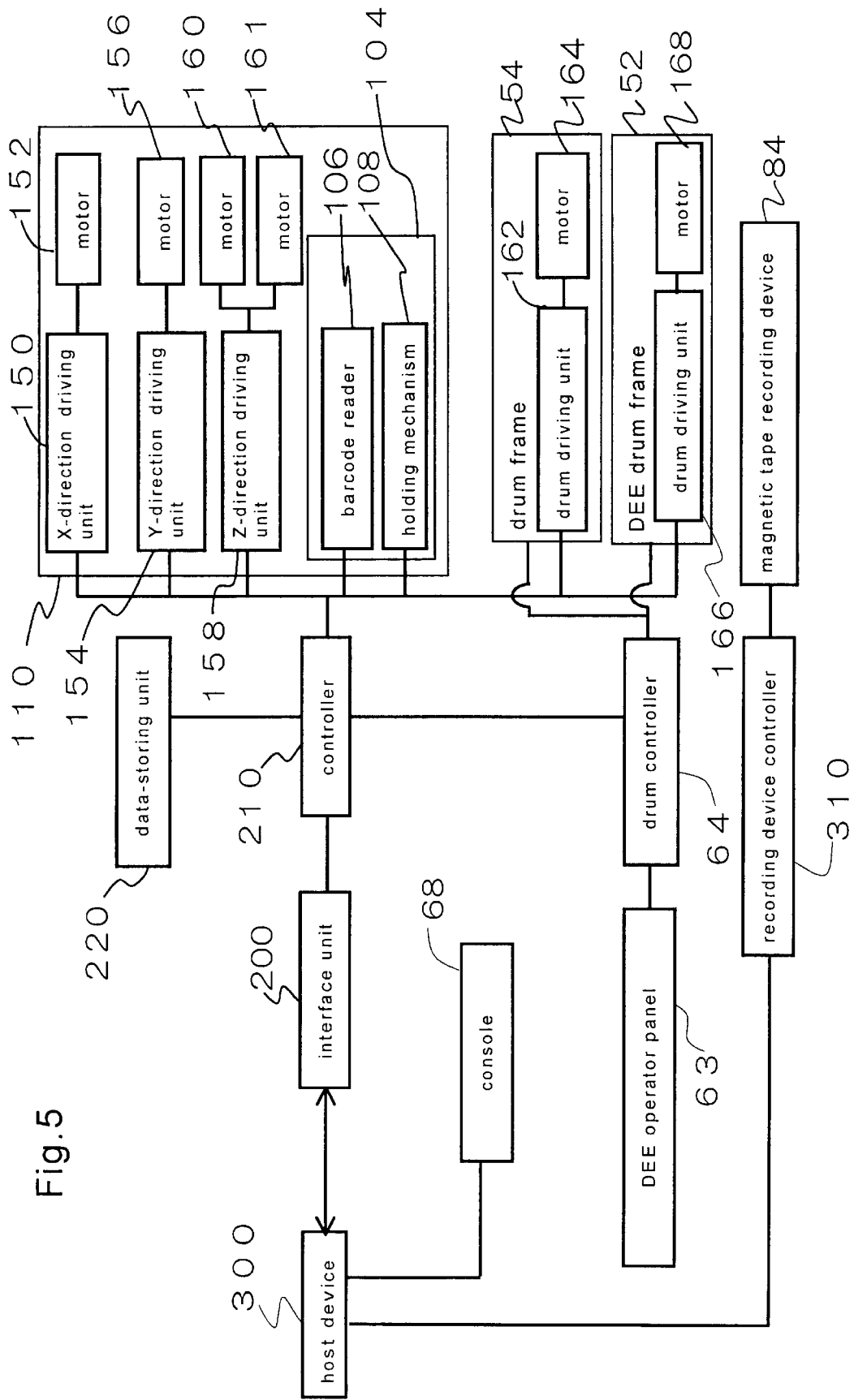
FIG. 5 is a block diagram showing the control system of the library apparatus shown in FIG. 3 according to the present invention.

Next, the control system of the library apparatus 50 will be roughly described with reference to FIG. 5. The control system of the library apparatus 50 is mainly composed of four parts.

A first part includes controlling the movement of the accessors 110 and the operation of the carriages 104.

A second part includes controlling the drum frames 54 and the DEE drum frames 52.

A third part includes exchanging data between the host device 300 and the console 68.

A fourth part includes exchanging data between the host device 300 and each cartridge.

A detailed description follows in order.

The first part, that is, controlling the movement of the accessors 110 and the operation of the cartridges 104 is described. When the host device 300 transmits an access command for a predetermined cell position to a controller 210 via an interface unit 200, the controller 210 reads position information in the X, Y, and Z directions of each cell, which is stored in a data-storing unit 220. Then, the controller 210 calculates a movement distance of the accessor 110 in the X-direction and of the barcode reader 106 in the Y-direction, which are needed for accessing the predetermined cell, based on the position information in the X, Y, and Z directions and the current position of the accessor 110 and the barcode reader 106 stored in the data-storing unit 220. The controller 210 controls an X-direction driving unit 150 based on the calculated movement distance and a motor 152 rotates the rollers 102 by a predetermined distance in the X-direction. Likewise, the controller 210 controls a Y-direction driving unit 154 and a motor 156 drives the carriage 104 so that the carriage 104 moves vertically by a predetermined distance in the Y-direction. Also, the controller 210 controls a Z-direction driving unit 158 and a motor 160 drives the barcode reader 106 and the holding mechanism 108 so that they move by a predetermined distance in the Z-direction. Further, the Z-direction driving unit 158 also controls the drive of a motor 161 for changing the direction of the barcode reader 106 and the holding mechanism 108 to the 0-side or the 1-side.

The barcode reader 106 is positioned at the predetermined cell position by these X-direction driving unit 150, Y-direction driving unit 154, and Z-direction driving unit 158. Incidentally, FIG. 5 shows the control system for one of the two accessors 110.

Further, the controller 210 controls the barcode reader 106. This control includes on/off control of reading light for reading a barcode and scanning control. Also, the controller 210 controls the holding mechanism 108. This control includes control of the movement of the holding mechanism for grabbing the cartridge 10 or 20 in a cell, a grabbing operation, and a holding operation. Further, the controller 210 has a determination unit for determining whether the data read by the barcode reader 106 is the data of the standard barcode label 12 or the data of the extended barcode label 22. The determination can be easily achieved based on the length of the read data.

Next, the second part, that is, controlling the drum frames 54 and the DEE drum frames 52 will be described. The control of each of the drum frames 52 and 54 includes opening/closing of each door 62 (see FIG. 3), selection of a predetermined face of each rotary drum 80, and rotation control of each rotary drum 80 so that a predetermined face of the rotary drum 80 faces the accessor 110 after the cartridges are inserted. When a command for a cartridge insertion instruction is input via the DEE operator panel 63, the lock of the door 62 is released and the rotary drum 80 rotates, by a motor 168 via a drum driving unit 166, so that a predetermined face of the rotary drum 80 faces the door 62. The predetermined face is controlled to rotate so as to face the accessor 110 in response to an insertion completion command. The rotation control information of the rotary drum 80 is also input to the controller 210 through a drum controller 64 and becomes control information for the accessor 110. FIG. 5 shows the control system for one of the frames 52 and one of the frames 54 for clarity.

Next, the third part, that is, exchanging data between the host device 300 and the console 68 will be described. In this embodiment, the console 68 is directly connected to the host device 300. Status conditions, such as a command from the host device 300, are displayed on the display of the console 68. Also, abnormal processing or the like in the library apparatus 50 is reported from the console 68 to the host device 300.

Next, the fourth part, that is, exchanging data between the host device 300 and each cartridge will be described. Each of the magnetic tape recording devices 84 is controlled by a recording device controller 310. Write data from the host device 300 is written on the cartridge which has been loaded on the magnetic tape recording device 84 by the accessor 110, and the data read from the cartridge is transmitted to the host device 300. FIG. 5 shows the control system for one of the magnetic tape recording devices 84 for clarity.

The foregoing is the description of the library apparatus 50 of the first embodiment of the present invention.

Subsequently, barcode-reading processing performed when the cartridges 10 and 20 are inserted via the DEE drum frame 52 will be described in detail with reference to FIGS. 6 and 7.

Figure 6:
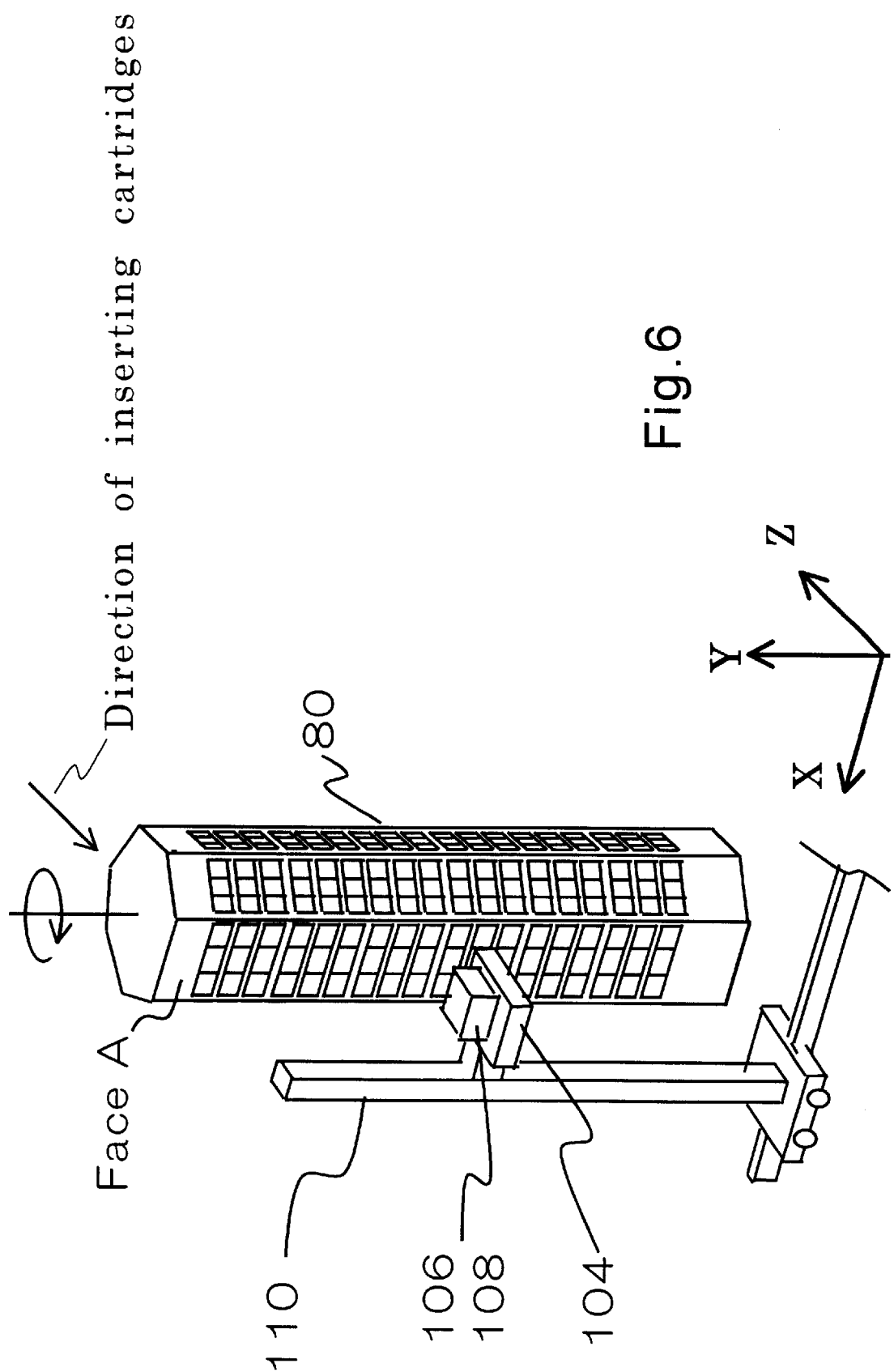
FIG. 6 is for illustrating an operation for reading a marker on a cartridge accommodated in a cell of a rotary drum of the library apparatus shown in FIG. 3 by a barcode reader.

FIG. 6 shows the accessor 110 and the drum 80 in the DEE drum frame 52, viewed from inside of the library apparatus toward the door 62. FIG. 7 is a flowchart of this insertion process. In the following description, the numbers in parentheses indicate each step in FIG. 7.

Figure 7:
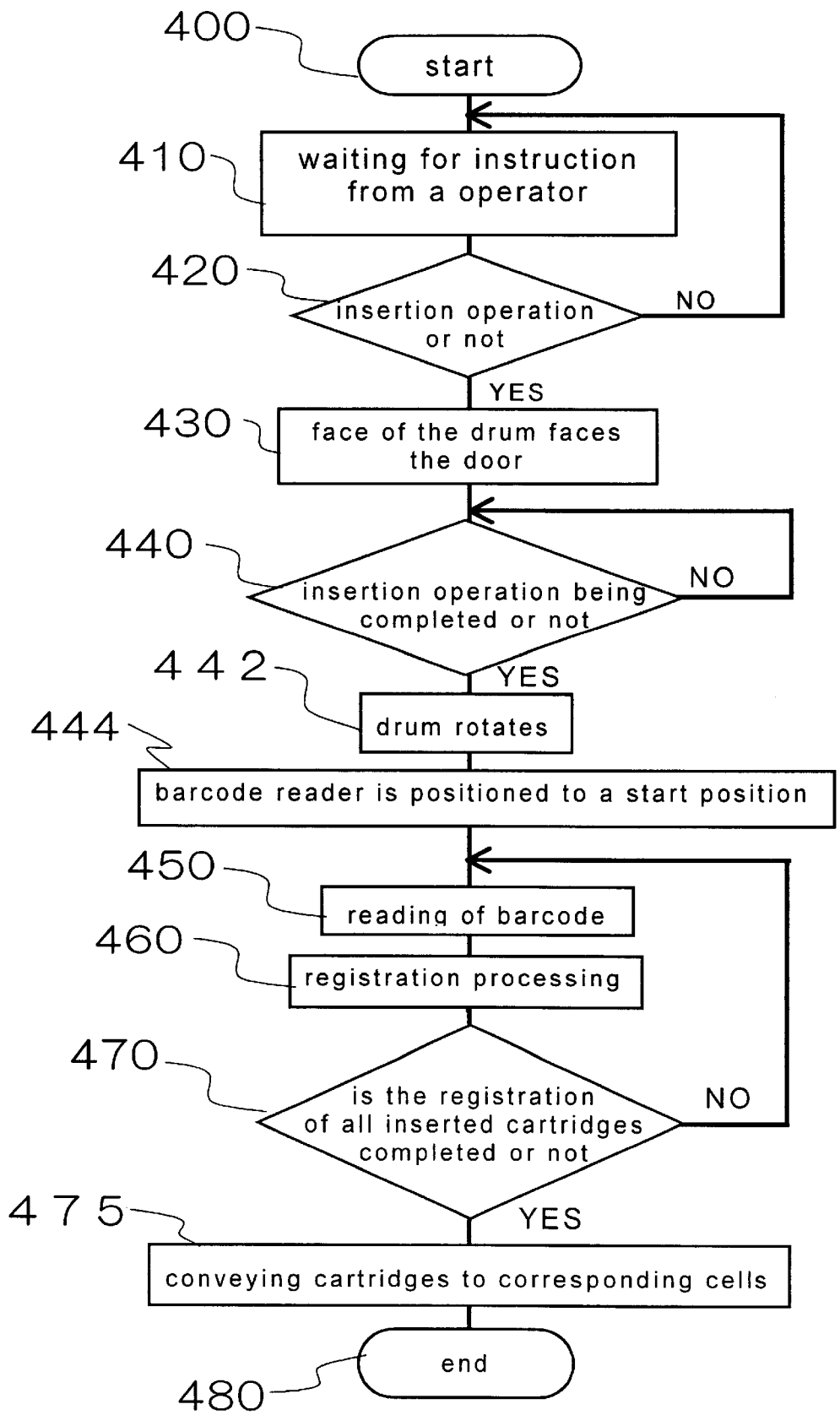
FIG. 7 is a flowchart for illustrating the reading operation by the barcode reader shown in FIG. 6.

When the library apparatus 50 enters a state in which it can perform insertion processing, it enters a standby mode in which it waits for an insertion processing operation instruction from the operator (400 and 410 in FIG. 7). The operator notifies the library apparatus 50 that it starts an insertion operation of the cartridges 10 and 20, using the DEE operator panel located on the left of the door 62 in the DEE drum frame 52 in FIG. 3 (420 in FIG. 7). In response to the notification, the drum 80 rotates so that one of the faces of the drum 80 faces the door 62 (see FIG. 3) (430 in FIG. 7). Then, the operator loads the cartridges 10 and 20 on many cells in the drum 80 from the insertion direction shown in FIG. 6. After loading, the operator notifies the library apparatus 50 of insertion completion using the DEE operator panel 63 (440 in FIG. 7). After the insertion operation has been completed, the drum 80 rotates so that a face A, which is loaded with the cartridges 10 and 20, faces the accessor 110 (442 in FIG. 7), the accessor 110 moves in the X-direction, the carriage 104 moves in the Y-direction, the barcode reader 106 is positioned to a start position for reading (444 in FIG. 7), and reading of the barcodes is started (450 in FIG. 7).

After the barcode reader 106 has finished reading the barcodes, the controller 210 (see FIG. 5) reads information of empty cells for accommodating the cartridge 10 or 20 from the data-storing unit 220 (FIG. 5) and transmits identification information and cell information of the cartridge 10 or 20 to the host device 300, so that the information is registered in the host device 300 (460 in FIG. 7). Then, after the registration of all inserted cartridges 10 and 20 (470 in FIG. 7), each of the cartridges 10 and 20 is conveyed to the corresponding cell (475 in FIG. 7) so as to complete the insertion processing (480 in FIG. 7).

Next, the above-described barcode-reading processing (450 in FIG. 7) will be described. This barcode-reading processing mainly includes a reading operation by the barcode reader 106 and a confirmation of the data of the marker of the cartridge 10 or 20 by the read data.

The reading operation by the barcode reader 106 will be described in detail with reference to FIGS. 8 to 10.

Figure 8:
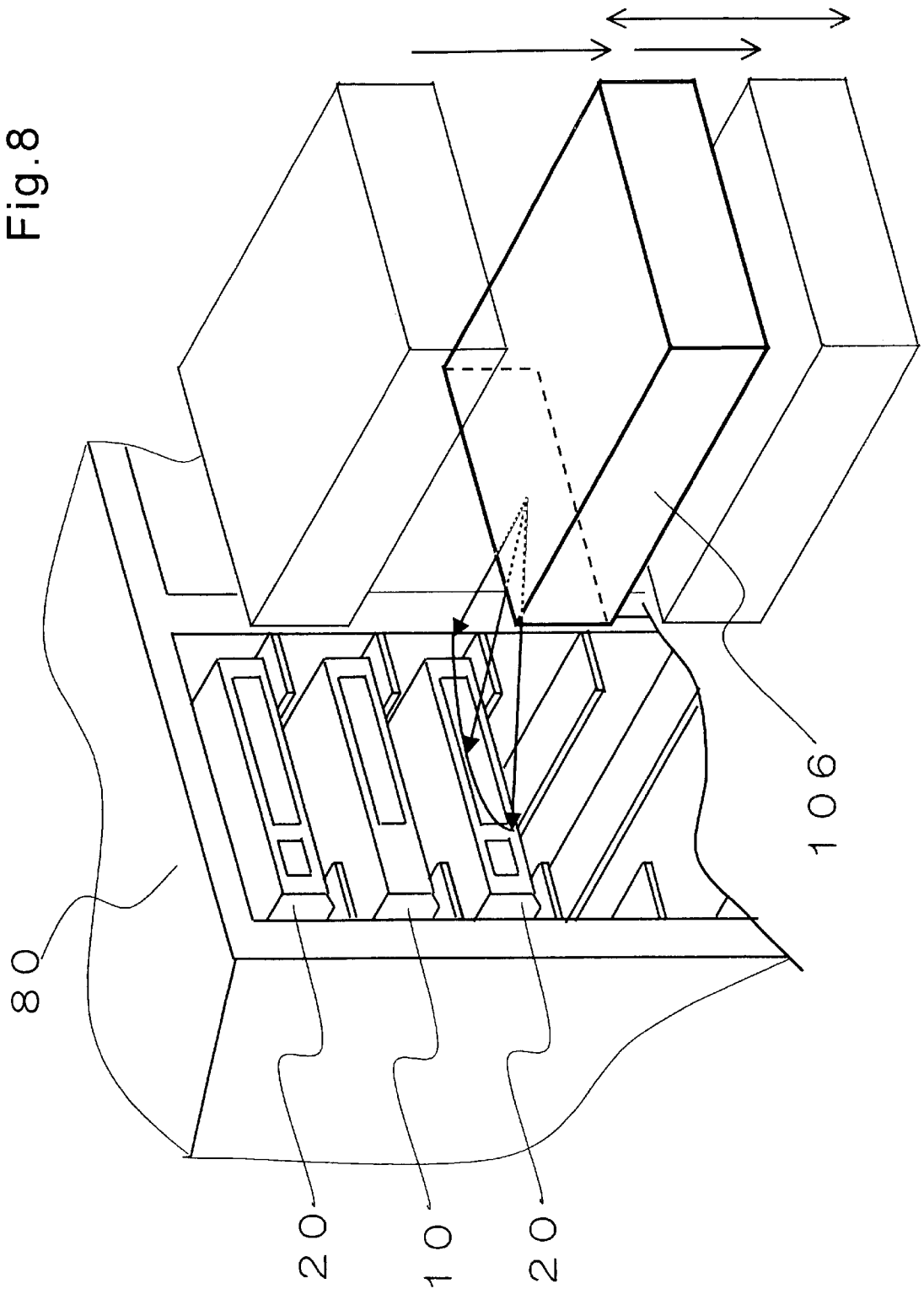
FIG. 8 is an enlarged view of a part of FIG. 6 and is for illustrating the case where the barcode reader reads barcode labels on the cartridges accommodated in combination.

FIG. 8 shows the state where the barcode reader 106 is moving downward while facing the cartridges 10 and 20 accommodated in the cells on the face A of the drum 80 shown in FIG. 6. As shown in the figure, the 36-track cartridges 10 and the 128-track cartridges 20 are accommodated together in the cells of the drum 80, and some cells are empty.

Figure 9:
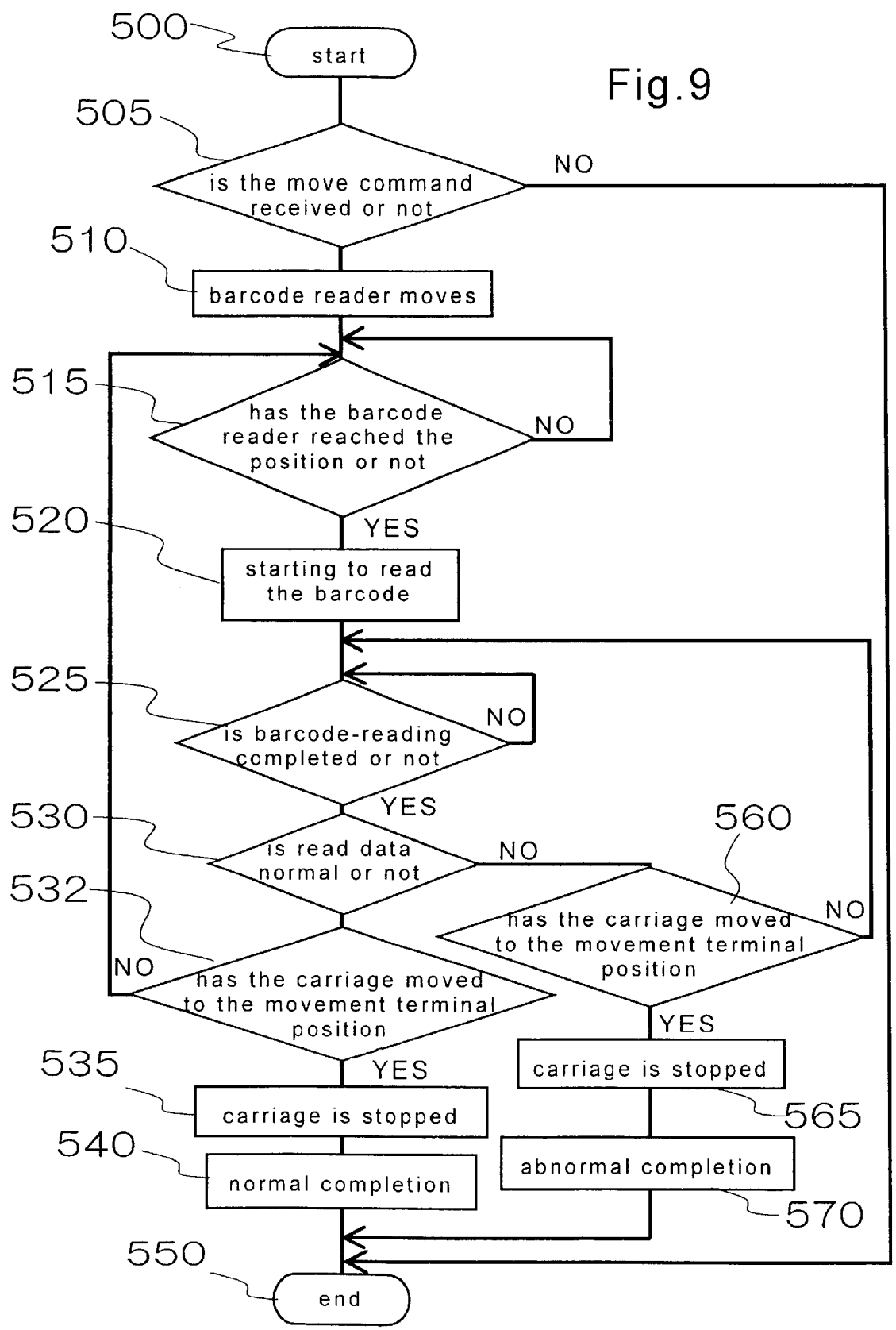
FIG. 9 is a flowchart for illustrating the reading operation shown in FIG. 8.
Figure 10:
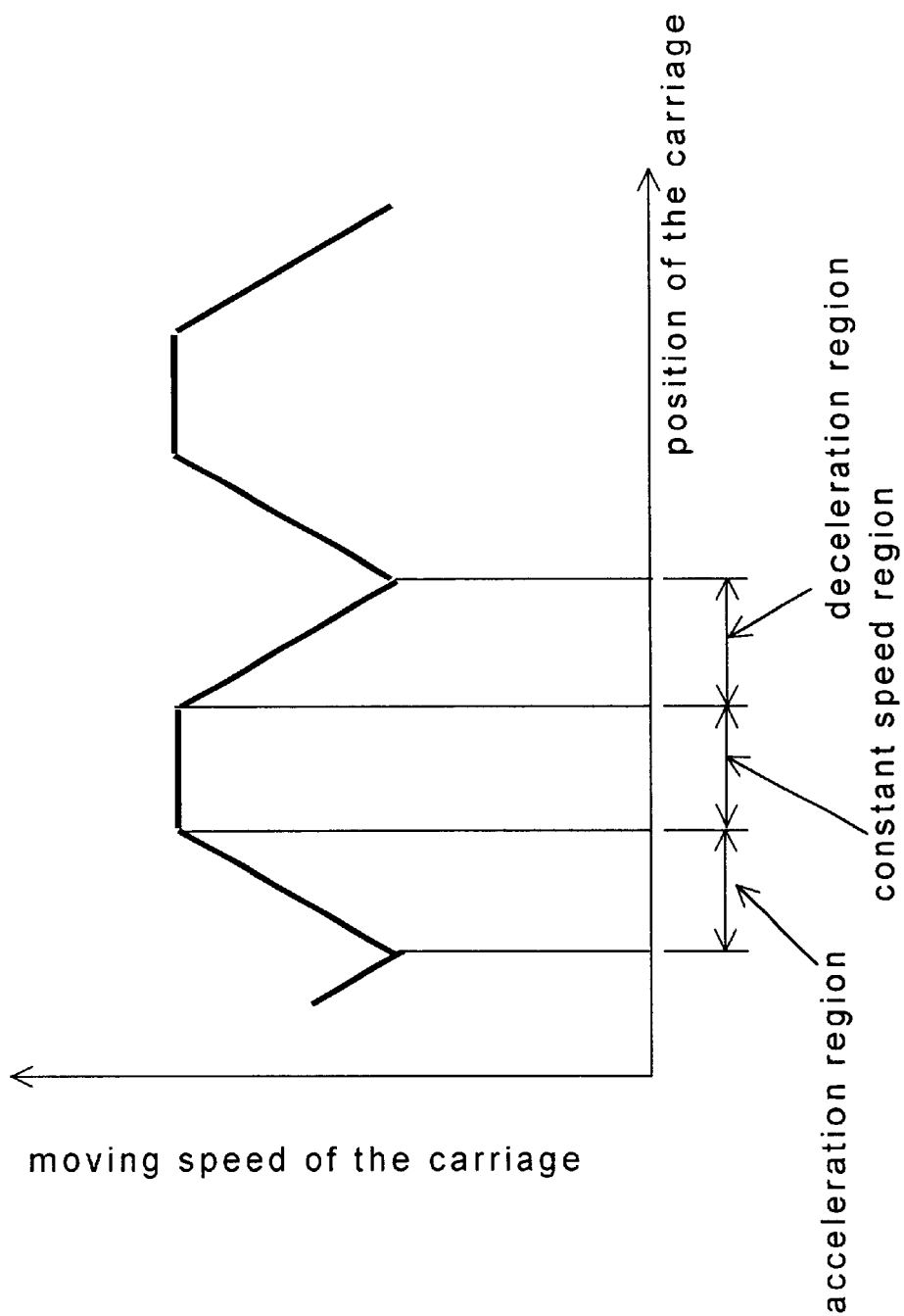
FIG. 10 is a diagram for showing the movement of a carriage mounting the barcode reader shown in FIG. 8.

FIG. 9 is a flowchart showing the barcode-reading operation. The operation will be described with reference to the flowchart. In the following description, the numbers in parentheses indicate each step in FIG. 9.

The reading processing can be performed after the cartridges have been inserted (500), and the standby mode for a command from the controller 210 for moving of the barcode reader 106 (see FIG. 5) begins. Upon the move command (505), the carriage 104 moves downward in FIG. 8 from the initial position and the barcode reader 106 also moves accordingly (510). The carriage 104 is moved by the Y-direction driving unit 154 and the motor 156 (see FIG. 5) and the movement distance is transmitted to the controller 210. The controller 210 determines whether or not the barcode reader 106 has reached the position for reading the barcode of the cartridge 10 or 20, based on the movement distance and the initial position which have been transmitted thereto (515). When the barcode reader 106 reaches the position for reading the barcode, the barcode reader 106 radiates reading light to the cartridge and receives reflection light while moving (520 and 525). At this time, if data is not received, for example, if the scanning position of the reading light is not at the position of the barcode reader label in FIG. 8, scanning is performed again with the reading light.

Then, when the read data is normal (530), it is determined whether or not the carriage 104 has moved to the movement terminal position (532). If the carriage 104 has reached the movement terminal position, the movement of the carriage 104 is stopped (535), and the console 68 and so on is notified of the determination of normal completion (540), so as to complete the reading processing (550).

If the carriage 104 has not reached the movement terminal position (532), the process returns to step 515 in FIG. 9.

On the other hand, if the read data is not normal (530), it is determined whether or not the carriage 104 is at the movement terminal position (560), and the data is received again if the carriage 104 is not at the movement terminal position (525). At 560 in FIG. 9, the carriage 104 stops if it has reached the movement terminal position (565). In this case, no barcode is read and thus the console 68 and so on is notified of abnormal processing (570) so as to complete the reading processing (550).

Incidentally, three lines of cells are aligned vertically on the face A of the drum 80, and the accessor 110 moves in the X-direction after it has read one line of cells. Then, the carriage 104 moves in the opposite direction to the previous line to read the next line. In this way, the movement of the whole accessor 110 takes time to read the cartridges on the face A, and thus the movement is suppressed to a minimum. Also, the carriage 104 may return to the original position in the Y-direction when it reads the cartridges in each line. However, it is preferable that the movement be reduced to a minimum in order to shorten the processing time.

Now, the speed control of the carriage 104 is described with reference to FIG. 10. In FIG. 10, the horizontal axis indicates the position of the carriage 104 and the vertical axis indicates the moving speed of the carriage 104. The speed control of the carriage 104 includes an acceleration region for accelerating the moving speed, a constant speed region where the carriage 104 moves at a constant speed, and a deceleration region where the carriage 104 is decelerated. Herein, the reading is performed by radiating reading light in the deceleration region. Since the reading is performed in the deceleration region, vibrations caused by the movement of the carriage 104 are reduced and flickering of the reading light from the barcode reader is also reduced, whereby stable reading with less read errors can be realized.

Next, a method for determining a marker of each cartridge based on the read data will be described with reference to FIGS. 11 to 20.

FIGS. 11 to 17 show a face of the cartridge to which a barcode label is attached. These figures are for illustrating that the barcode information included in the read data changes in accordance with the relationship between the position of the barcode label and the scanning position of reading light. Herein, FIGS. 13 to 17 illustrate cases where at least one of the labels is not read.

Further, FIGS. 18 to 20 show the correspondence between the read data obtained when reading is performed three times at most and the confirmed marker on the cartridge.

Figure 11:
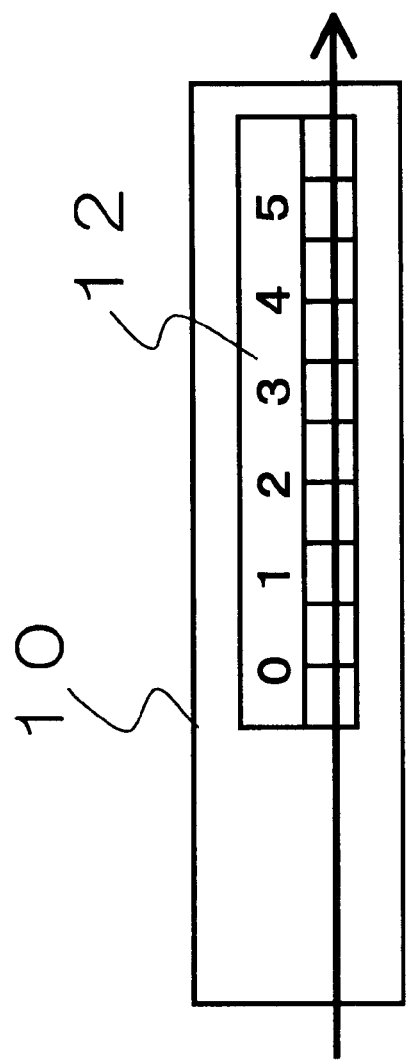
FIG. 11 shows a scanning position of reading light when the barcode label on the 36-track magnetic tape cartridge is accurately read.
Figure 12:
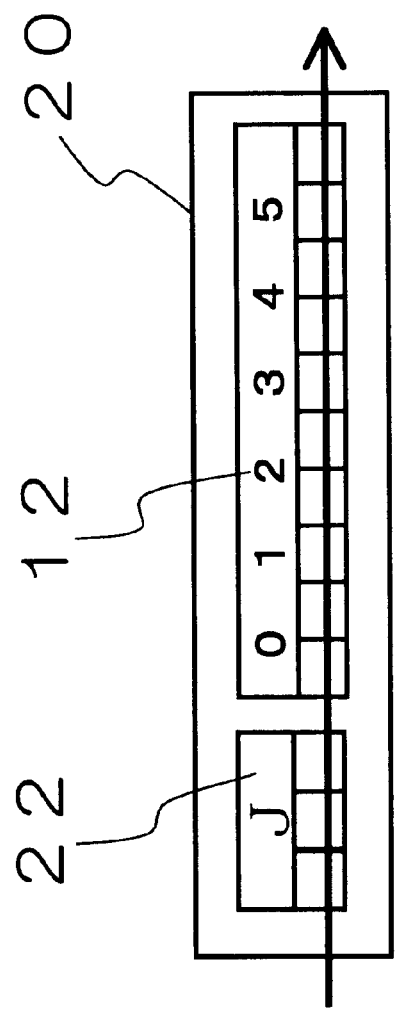
FIG. 12 shows a scanning position of reading light when the barcode labels on the 128-track magnetic tape cartridge is accurately read.

FIGS. 11 and 12 show examples where the reading light accurately scans the barcode of each barcode label on the cartridges 10 and 20.

Figure 13:
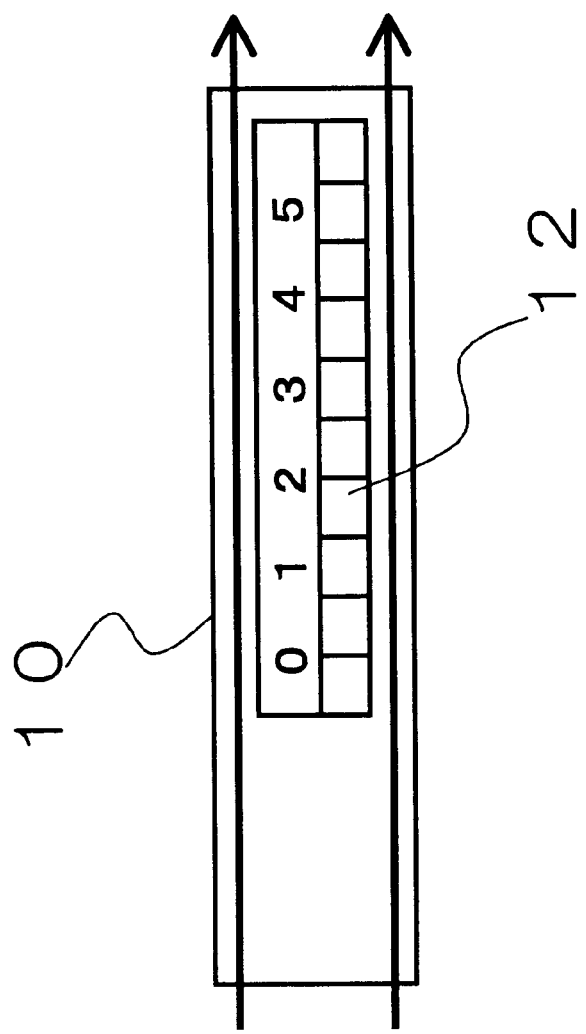
FIG. 13 shows an example of scanning position of reading light when the barcode label on the 36-track magnetic tape cartridge is not read.

FIG. 13 shows the scanning position of the reading light in a case where the standard barcode label 12 of the 36-track cartridge 10 cannot be read.

Figure 14:
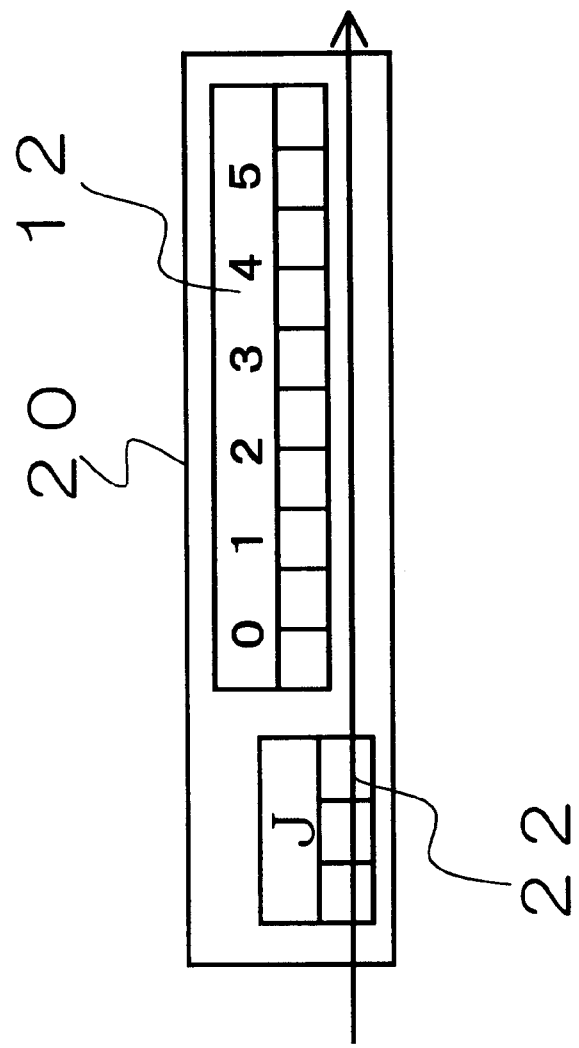
FIG. 14 shows an example of scanning position of reading light when only an extended barcode label on the 128-track magnetic tape cartridge is read.
Figure 15:
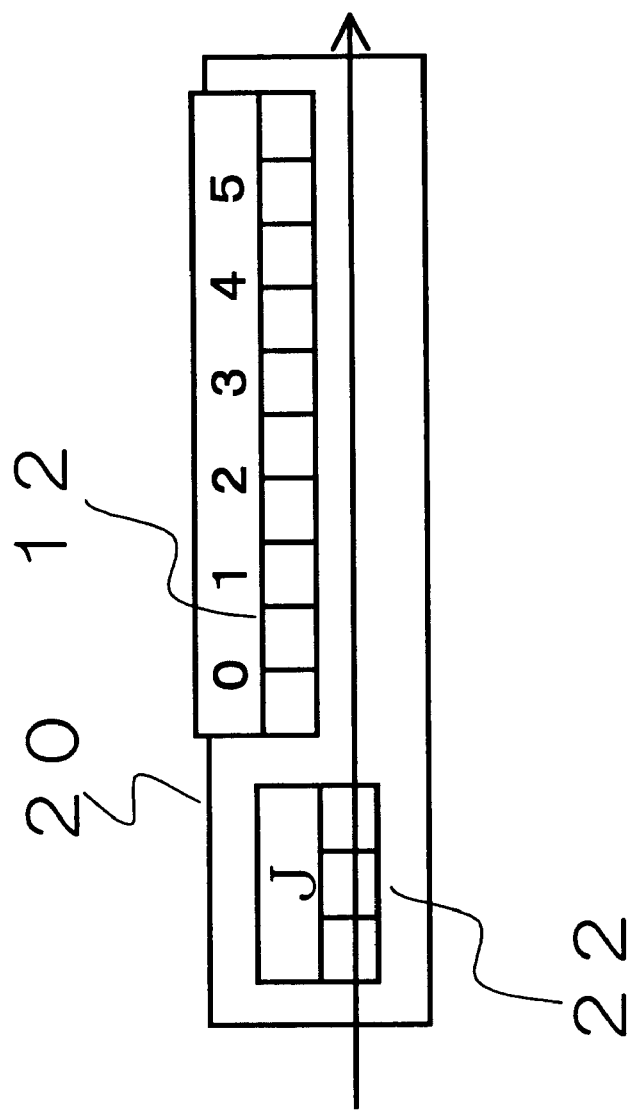
FIG. 15 shows an example of scanning position of reading light when only the extended barcode label on the 128-track magnetic tape cartridge is read.

FIGS. 14 to 17 show the position of each of the labels 12 and 22 and the scanning position of the reading light in a case where at least one of the labels on the 128-track cartridge 20 cannot be read. In FIGS. 14 and 15, only the extended barcode label 22 is read. In FIG. 14, the extended barcode label 22 is attached at a position lower than the reference position, and in FIG. 15, the standard barcode label 12 is attached at a position higher than the reference position.

Figure 16:
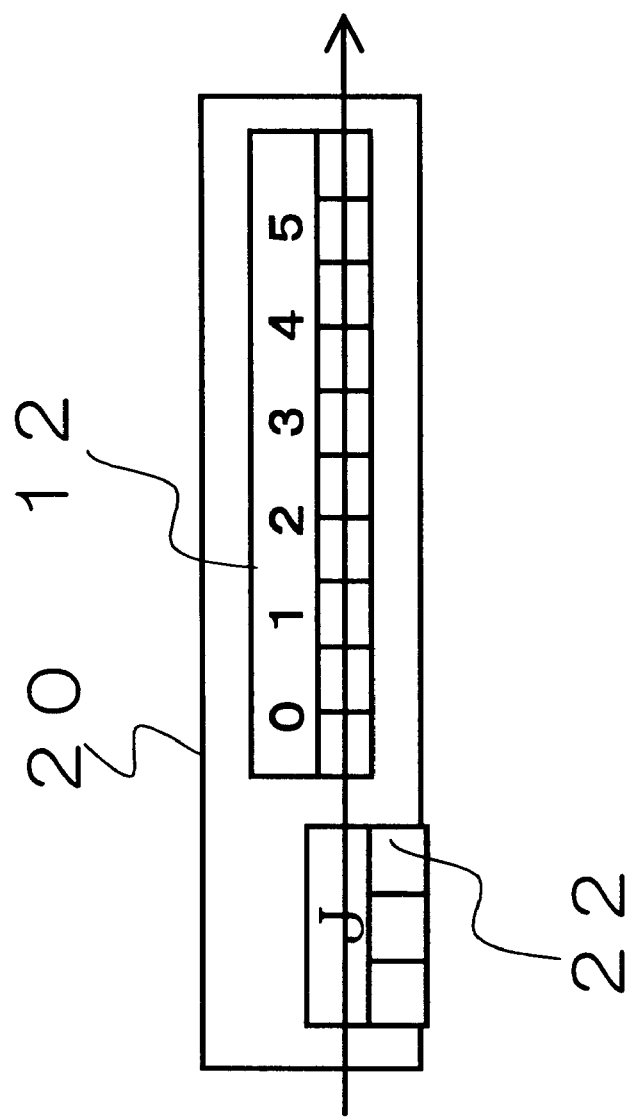
FIG. 16 shows an example of scanning position of reading light when only a standard barcode label on the 128-track magnetic tape cartridge is read.

In FIG. 16, only the standard barcode label 12 is read and the extended barcode label 22 is attached at a position lower than the reference position.

Figure 17:
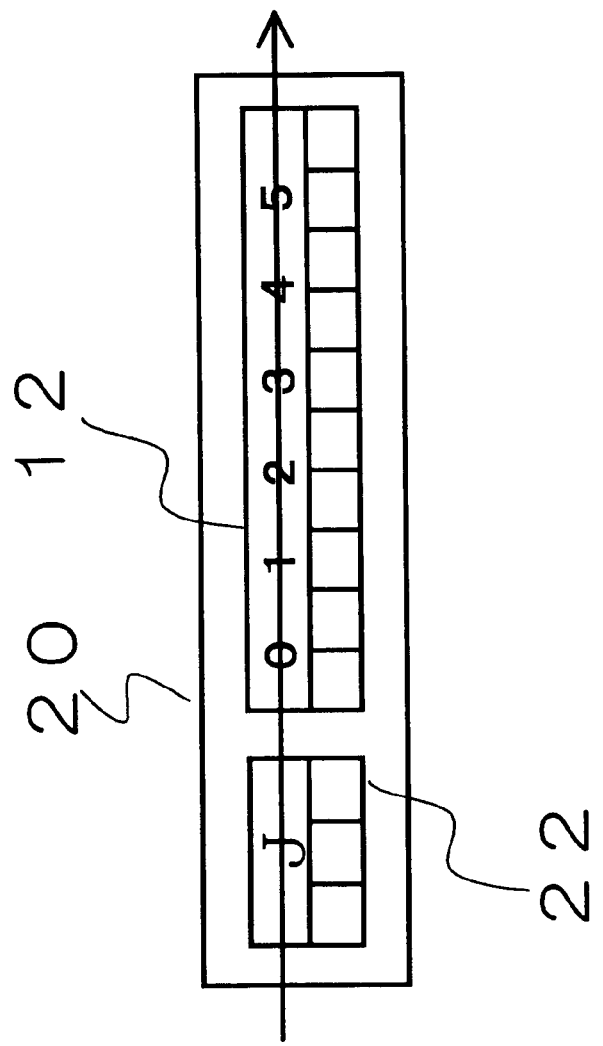
FIG. 17 shows an example of scanning position of reading light when neither the extended barcode label nor the standard barcode label on the 128-track magnetic tape cartridge is read.

In FIG. 17, none of the barcode labels are read.

For example, when only the extended barcode label 22 is read, as in FIG. 14, a read retry is performed by moving the barcode reader (for example, the same barcode reader as the barcode reader 106 of the present invention shown in FIG. 8) upward in the known art. Also, when only the standard barcode label 12 is read, as shown in FIG. 16, a read retry is performed by moving the barcode reader downward. That is, when at least one of the labels cannot be read, a read retry is performed by moving the barcode reader upward or downward, by estimating the position of the other label.

Therefore, reread processing takes time because the barcode reader must be temporarily stopped and then started again to move. This is inconvenient in a library apparatus in which different types of cartridge are used in combination.

On the other hand, in the reading method according to the present invention, the barcode reader 106 need not be temporarily stopped and reread processing is performed when one of the labels cannot be read (see FIG. 9). Accordingly, the barcode reader 106 need not be restarted to move, and thus the barcode label can be read in a short time.

Subsequently, the correspondence between the read data of the label on the cartridge 10 or 20 used in this embodiment and the confirmed data of the barcode label on the cartridge 10 or 20 will be described with reference to FIGS. 18 to 20.

In the embodiment according to the present invention, reading of the label on a cartridge is performed three times at most, including retries.

The terms in FIGS. 18 to 20 are explained below. "No data" means no barcode is read, "standard data" means the data of a standard barcode label, "extended data" means the data of an extended barcode label, and "extended+standard data" means the data of both barcode labels. Further, "standard label" means a standard barcode label, "extended label" means an extended barcode label, and "extended+standard label" means an extended barcode label and a standard barcode label. An oblique line indicates that reading is not performed at that time.

When reading of the data is performed, there may be four cases: "no data" in which no data is read, "standard data only", "extended data only", and "both extended data and standard data".

The method for correspondence is described below.

Herein, if standard data and extended data are read during any reading, reading is not performed any more, and the read data is confirmed as the 128-track cartridge and a volume label.

FIG. 18 shows the case where data is not read during the first reading, FIG. 19 shows the case where only the data of a standard barcode label is read during the first reading, and FIG. 20 shows the case where only the data of an extended barcode label is read during the first reading. As described above, when the read data is "extended data and standard data", the data is confirmed and reading is not performed any more.

The case where no data is read during the first reading is described with reference to FIG. 18. In this case, since no data is read during the first reading, reread processing is performed by returning from step 530 to step 525 via step 560 in FIG. 9. At this time, the barcode reader 106 does not pause and continues to perform rereading, while moving in the same direction.

The following four cases may occur in the second reading.

(1) When No Data is Read During the Second Reading

The third reading is performed by moving the barcode reader 106.

The following cases may occur in the third reading.

When no data is read: It is determined that there is no label.

When only standard data is read: It is determined that there is only a standard label, and it is confirmed that the cartridge is the 36-track cartridge 10 and that the read data is the volume label of the standard barcode label 12.

When only extended data is read: It is determined that there is only an extended label and that the standard barcode label 12 is not read although the cartridge is the 128-track cartridge 20.

When both extended data and standard data are read, it is determined that the extended label and the standard label are attached to the cartridge, and it is confirmed that the cartridge is the 128-track cartridge 20 and that information of the standard barcode label 12 is a volume label.

(2) When Only Standard Data is Read During the Second Reading

In this case, it cannot be confirmed whether the cartridge is the 36-track cartridge 10 or the 128-track cartridge 20. Thus, a third reading is performed by moving the barcode reader 106.

The following cases may occur in the third reading.

When no data is read: It is determined that only the standard label is attached to the cartridge, and it is confirmed that the cartridge is the 36-track cartridge 10 and that the information of the standard barcode label is a volume label.

When only standard data is read: It is determined that only the standard label is attached to the cartridge, and it is confirmed that the cartridge is the 36-track cartridge 10 and that the information of the standard barcode label 12 is a volume label.

When only extended data is read: In this case, for example, two barcode labels are attached in the manner shown in FIG. 16 and the barcode reader 106 is moved downward so as to perform reading. Reading light is radiated in the direction indicated by an arrow in the figure during the second reading and only the extended barcode label 22 is scanned during the third reading. Accordingly, in this case, it is confirmed that the cartridge is the 128-track cartridge 20 and that the information of the standard barcode label 12 is a volume label.

When extended data and standard data are read: When both extended data and standard data are read, it is determined that the extended label and the standard label are attached to the cartridge, and it is confirmed that the cartridge is the 128-track cartridge 20 and that the information of the standard barcode label 12 is a volume label.

(3) When Only Extended Data is Read During the Second Reading

In this case, the cartridge can be determined to be the 128-track cartridge 20, but the volume label cannot be confirmed. Thus, the third reading is performed by moving the barcode reader 106.

The following cases may occur in the third reading.

When no data is read: In this case, it is determined that only the extended label is attached to the cartridge.

When only standard data is read: The extended data read during the second reading and the standard data read during the third reading are determined together, and it is confirmed that the cartridge is the 128-track cartridge 20 and that the information of the standard barcode label 12 is a volume label.

When only extended data is read: In this case, it is confirmed that only the extended data is attached to the cartridge.

When extended data and standard data are read: When both extended data and standard data are read, it is determined that the extended label and the standard label are attached to the cartridge, and it is confirmed that the cartridge is the 128-track cartridge 20 and that the information of the standard barcode label 12 is a volume label.

The foregoing is the case where no data is read in the first reading.

Likewise, in the case where only the standard data is read during the first reading and in the case where only the extended data is read during the first reading, the confirmation data is associated with the read data by three readings as shown in FIGS. 19 and 20, respectively.

In FIGS. 18 to 20, it is eventually confirmed that the cartridge is the 36-track cartridge 10 in the seven cases 610 to 670. Among these cases, the standard barcode label 12 is accurately read during the first reading in 640, 650, 660, and 670. The standard barcode label 12 is accurately read during the second reading in 620 and 630. When different types of cartridge are not used, the subsequent readings are unnecessary.

In this way, when the 36-track cartridges 10 and the 128-track cartridges 20 are used in combination, the number of readings increases. Accordingly, the barcode reading takes more time compared to the case where only one type of cartridge is used. In this embodiment, however, reading time can be decreased because the barcode reader 106 reads barcode labels without stopping.

In the first embodiment, reading is performed three times at most. Increasing or decreasing the number of readings causes a trade-off between the accuracy of the confirmation data and the time required for reading. The reading may be performed more than three times or less than three times.

Also, in the first embodiment, the case where the cartridges accommodated in the cells of the drum 80 are read is described. However, the above-described method can be applied to read the barcode labels on the cartridges accommodated in the library apparatus 50 and the cartridges inserted in the CAS entry 61.

Further, in the first embodiment, a laser barcode reader is used. That is, in this type of barcode reader, a laser beam from a semiconductor laser as a light source is used for reciprocation scanning by a scanning mirror. In a barcode reader which may be used in the present invention, an LED array or a white lamp is used as a light source and a CCD technique may be applied in which a CCD array receives scattered reflection light from the barcode label.

Also, in the first embodiment, a label in which a barcode and characters are recorded in two lines is used as a barcode label, but the barcode and the characters may be placed in one line. Further, the code may include only numbers (for example, a code name JAN: Japanese Article Number and a code name ITF: Interleav-ed Two of Five), alphanumeric characters and code (for example, CODE 39), or a number and a code (for example, CODEBAR (NM-7)).

In the construction and method of the first embodiment, the barcode labels on the cartridges accommodated in the cells of the drum 80 is read by the barcode reader 106 mounted on the accessor 110. However, a barcode reader for exclusively reading the cartridges accommodated in the cell in the drum 80 may be provided in the DEE drum frame.

Also, in the first embodiment, the speed of the carriage 104 is controlled by dividing the speed into the acceleration region, the constant speed region, and the deceleration region, and reading is performed in the deceleration region. However, the speed may be divided into the acceleration region and the deceleration region and reading may be performed in the deceleration region.

In addition, the position of the carriage 104 and the position of each cell are stored in the data-storing unit 220. The movement of the barcode reader 106 is controlled in a predetermined manner and the moving speed is determined. Therefore, the controller 210 can estimate the time required for the barcode reader 106 to reach the position for reading the barcode of a cell. Reading by the barcode reader 106 may be started or completed at each cell based on the estimated time.

Also, in the first embodiment, the 36-track cartridges 10 and the 128-track cartridges 20 are used in combination as recording media. However, other recording media such as video tapes and optical disks may be used. When other recording media are used, a recording/reproducing device corresponding to the magnetic tape recording device 84 may be provided in the library apparatus 50.

In addition, still other types of recording media may be used in combination by increasing the number of types of label.

In the above-described first embodiment, the reading method based on (1): Speeding up the read processing because the number of retries increases when different types of magnetic tape cartridge are used, is described in detail.

Subsequently, a second embodiment regarding the construction based on (2): Even when different types of magnetic tape cartridge are used in combination, the cartridges can be identified by means other than a label, will be described in detail with reference to FIGS. 21 to 23.

Figure 21:
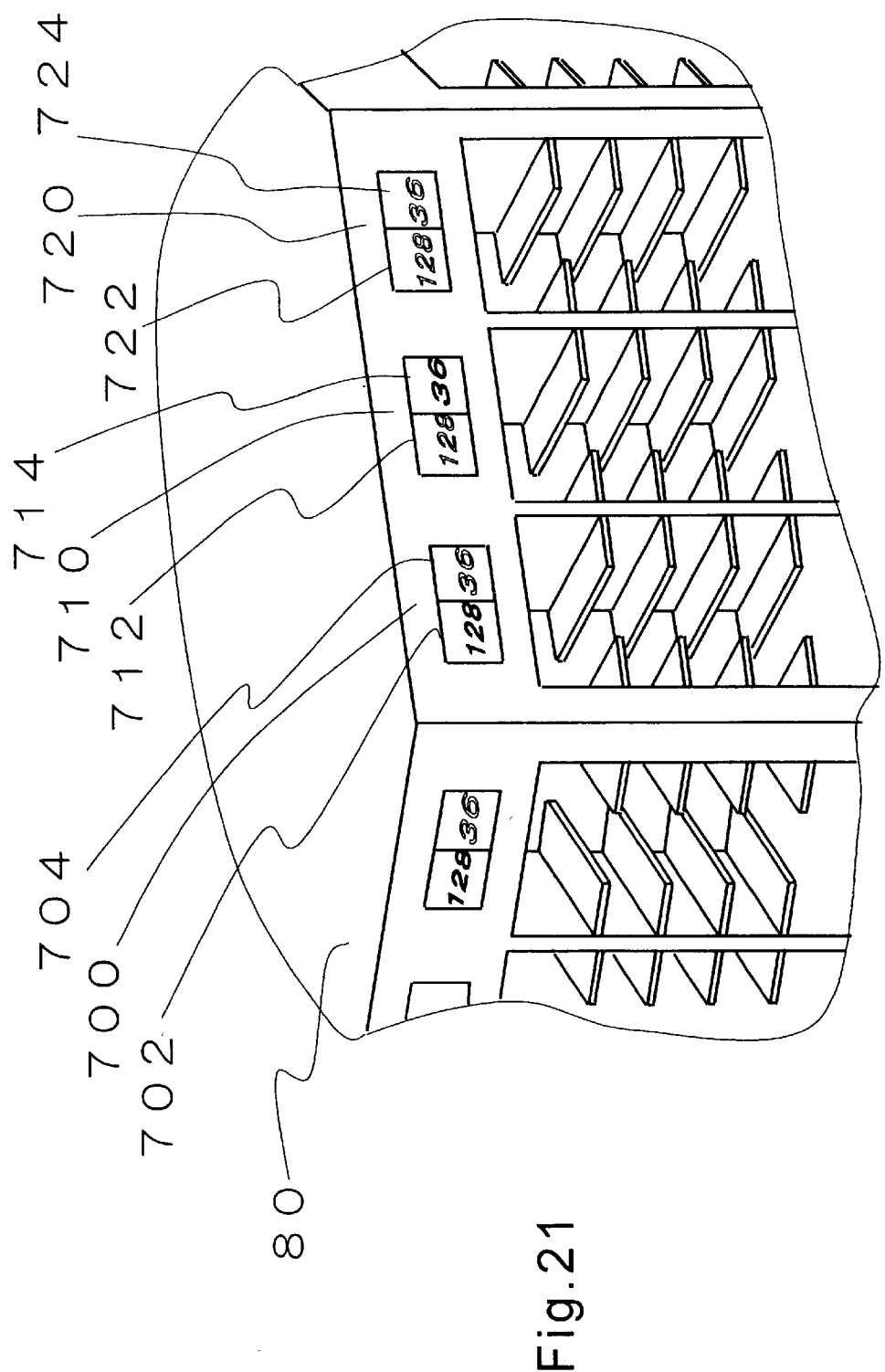
FIG. 21 shows the critical portion of a rotary drum according to the present invention, in which the types of cartridge to be accommodated in a container of the rotary drum for accommodating the cartridges are displayed.
Figure 22:
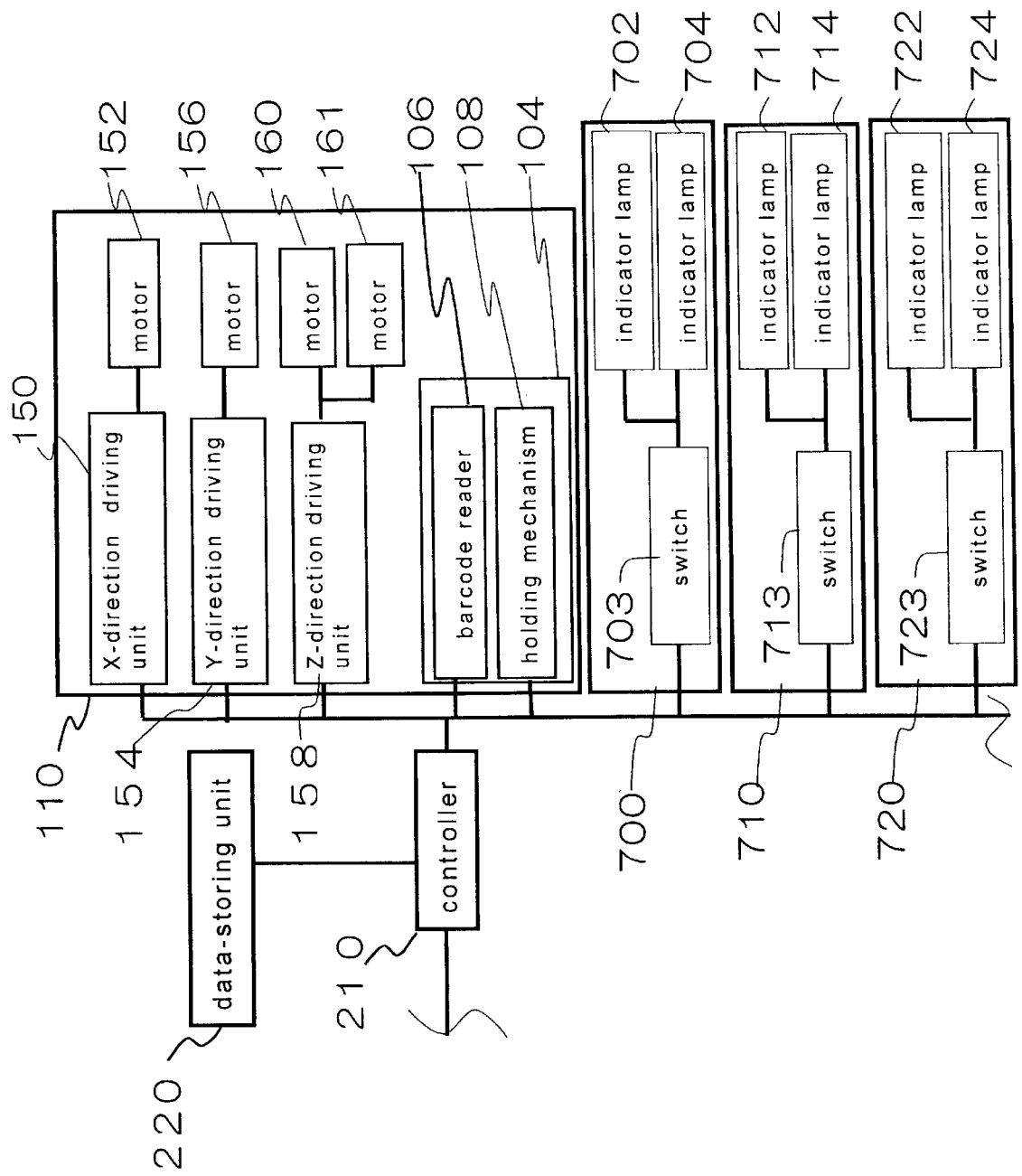
FIG. 22 shows the critical portion of the control system of the library apparatus when the rotary drum shown in FIG. 21 is used.

In the second embodiment, identification means are provided in the drum 80 which is an insertion unit for inserting the cartridges, as show in FIG. 21, in addition to the first embodiment. FIG. 21 shows the construction in which indicators 700, 710, 720, and so forth for indicating the type of cartridge to be accommodated in the cell are provided on each face of the drum 80 of the library apparatus 50 being associated with the vertical lines. The construction of the indicators will be described by taking the indicator 700 as an example. The indicator 700 includes a three-contact switch 703 and indicator lamps 702 and 704 (see also FIG. 22), the indicator lamp 702 indicates "128" when illuminated, and the indicator 704 indicates "36" when illuminated. Also, the indicator lamps 702 and 704 and the three-contact switch 703 are associated with each other. A neutral contact of the three contacts is selected by pressing any of the indicator lamps and one of the lamps is lit by further pressing the indicator lamp.

This is the same for the other indicators 710, 720, and so forth, and the same indicator is provided for each line of the other faces of the drum 80.

In FIG. 21, the indicator lamp 702 of the indicator 700 is illuminated and "128" is displayed, and the indicator lamp 714 of the indicator 710 is illuminated and "36" is displayed. The neutral contact is selected in the indicator 720 and neither of the indicator lamps 722 and 724 is illuminated.

By using the display, the operator can accommodate 128-track cartridges 20 in the cells in the line with the indicator 700, the 36-track cartridges 10 in the cells in the line with the indicator 710, and the both types of cartridges in the cells in the line with the indicator 720.

Subsequently, reading of the barcode label on the cartridge in each line will be described in order.

(1) Reading Operation in the Line with Indication "128"

The cells in this line include only the 128-track cartridges 20. As show in FIG. 22, the information of the three-contact switch 703 associated with the indicator lamp 702 is input to the data-storing unit 220 via the controller 210, and then the position of the line with the indicator 700 on the corresponding face of the drum 80 and the type of cartridge (that is, the 128-track cartridge 20) are stored.

When insertion completion at step 440 shown in FIG. 7 is reported to the controller 210, reading processing is started.

The accessor 110 moves to the position of the indicator lamp 700, and barcode reading is started (step 520 in FIG. 9).

After that, the cartridges are identified by the correspondence between the read data and the confirmation data shown in FIGS. 18 to 20.

(2) Reading Operation in the Line with Indication "36"

The cells in this line include only the 36-track cartridges 10. As show in FIG. 22, the information of the three-contact switch 713 associated with the indicator lamp 714 is input to the data-storing unit 220 via the controller 210, and then the position of the line with the indicator 710 on the corresponding face of the drum 80 and the type of cartridge (that is, the 36-track cartridge 10) are stored.

In this case, barcode reading is performed in the same way as in the reading operation in the line with indication "128" in (1). However, since this line does not include the 128-track cartridges 20, the data of the extended barcode label does not exist in the correspondence between the read data and the confirmation data shown in FIGS. 18 to 20. In this case, the correspondence between the read data and the confirmation data is shown in FIG. 23, where the data is confirmed as a standard label when the standard data is read, and the read data is the volume label of the cartridge.

(3) Reading Operation in the Line Indicating Neither 128" Nor "36"

In the reading of this line, the same reading operation as in the first embodiment is performed.

In the second embodiment, reading of the 36-track cartridge 10 can be performed more easily than in the first embodiment, and thus the speed of the reading operation can be increased.

In the second embodiment, the indicator lamp is provided in each line of the drum 80. However, one indicator lamp 700 may be provided on each face.

Figure 24:
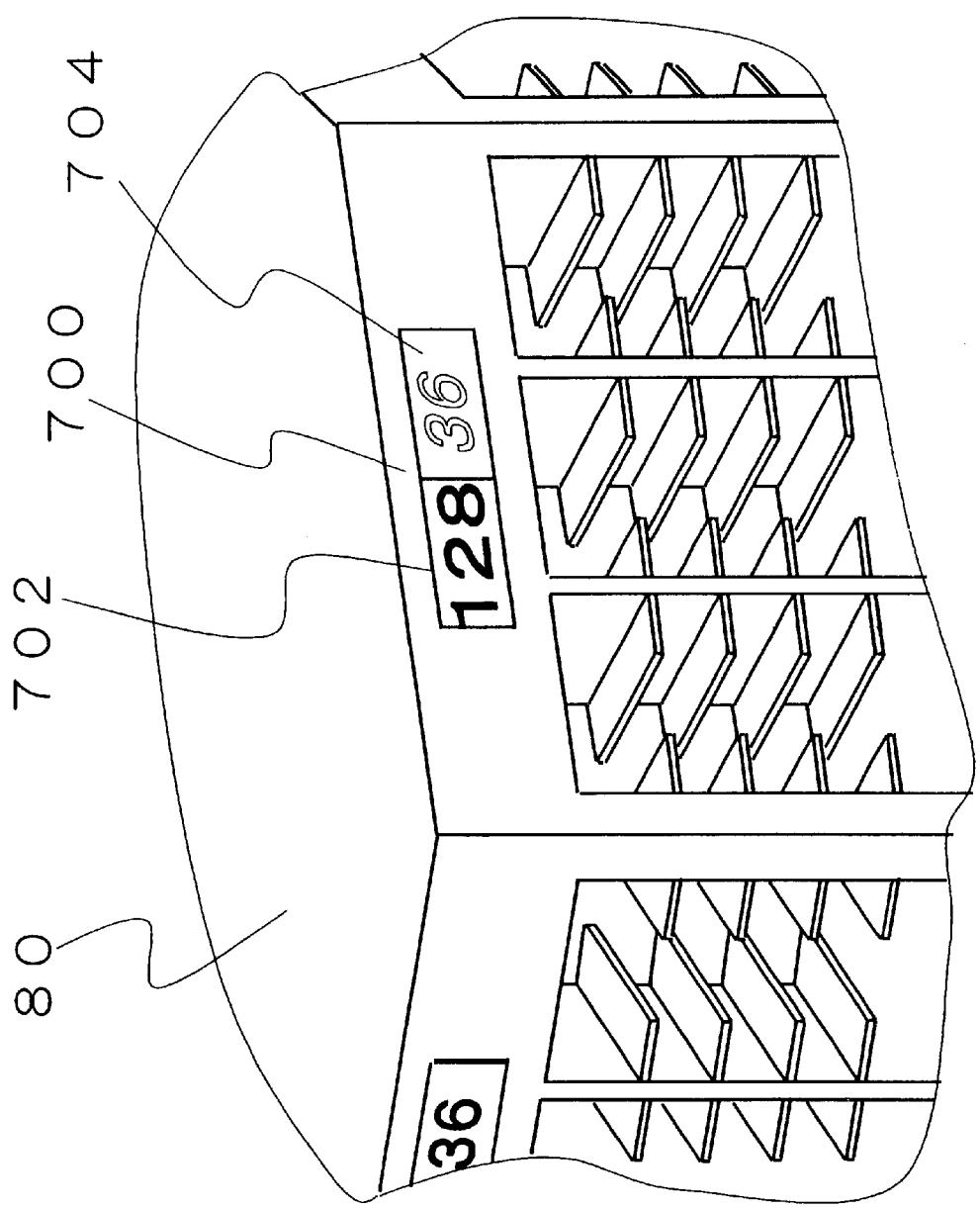
FIG. 24 shows the critical portion of a rotary drum according to the present invention in which the type of cartridge to be accommodated in a face of the rotary drum is displayed.

Also, the drum 80 may have a face provided with an indicator lamp for each line, as shown in FIG. 21, and a face provided with one indicator lamp, as shown in FIG. 24, in combination.

In addition, an indicator lamp may be provided somewhere in the line of the drum 80 so as to sort the types of cartridge.

Figure 25:
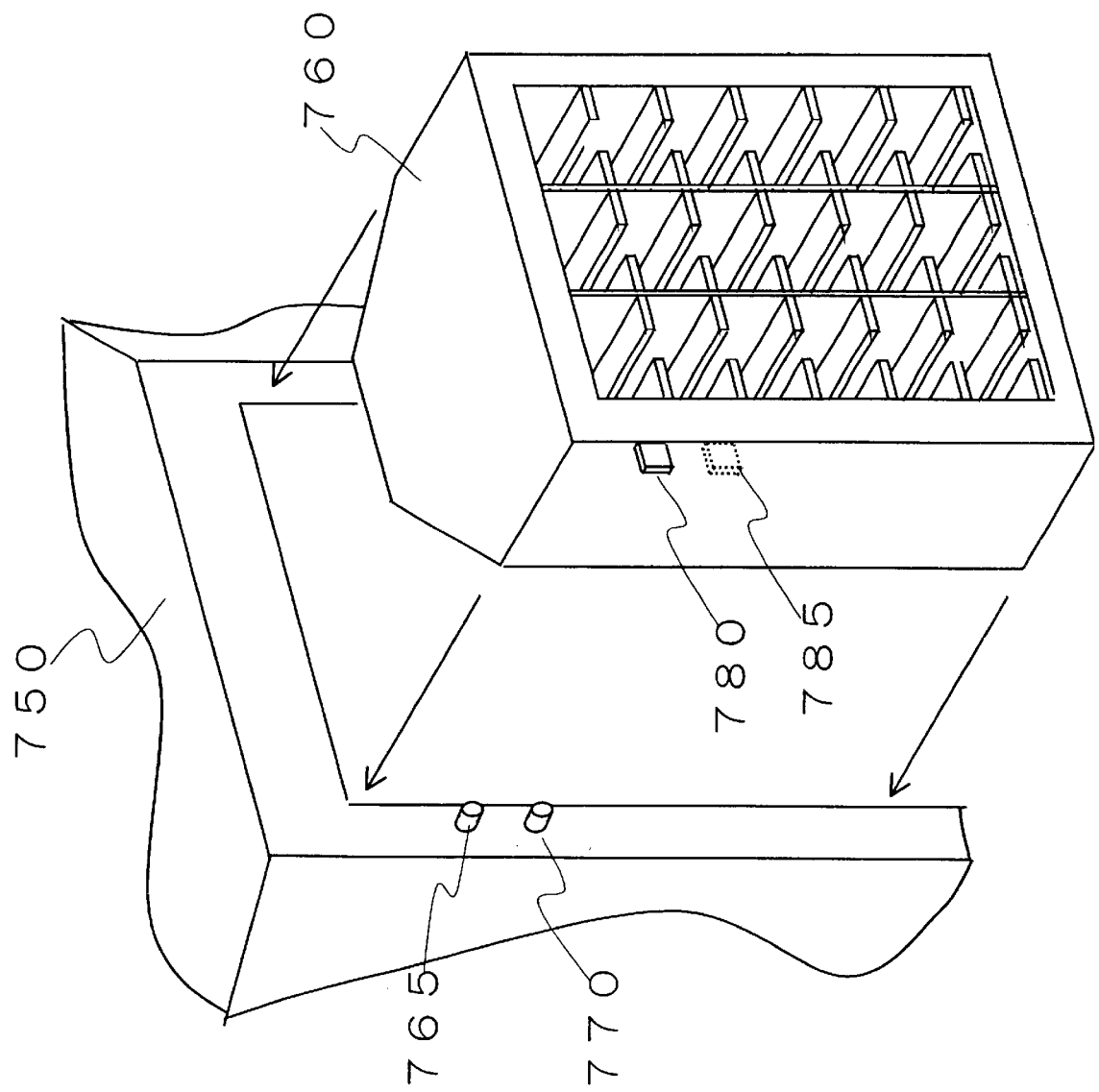
FIG. 25 shows the critical portion of a magazine and a rotary drum according to the present invention, in which the construction for specifying the type of cartridge to be accommodated in the magazine and for detecting the type is shown in a magazine-type cartridge container.

Next, a third embodiment will be described with reference to FIG. 25.

The third embodiment also concerns the construction for sorting the types of cartridge to be accommodated. In the first embodiment, each cell of the drum 80 is fixed to the drum 80. In a drum 750 of the third embodiment, a container called a magazine 760 which has many cells and which is removable, that is, an insertion portion for inserting the cartridges, can be installed for easy use.

The position of a flag can be changed in accordance with the type of cartridge to be accommodated in the magazine 760. A flag 780 in FIG. 25 indicates a mounting state when the 128-track cartridge 20 is accommodated in the magazine 760 and the mounting state of a flag 785 shown by a broken line indicates a case where the 36-track cartridge 10 is accommodated in the magazine 760. Detection pins 765 and 770 associated with a switch are provided in the drum 750, in accordance with the position of the flags 780 and 785. Accordingly, it can be detected whether the magazine 760 accommodates the 128-track cartridge 20 or the 36-track cartridge 10. Incidentally, an ON/OFF signal of the foregoing switch is transmitted to the controller 210.

In the third embodiment, the type of cartridge to be accommodated in the magazine 760 is indicated by the position of the flag 780 or 785 so that the operator mounts cartridges by type and notifies the library apparatus 50 of the type. Accordingly, the operation for reading the 36-track cartridge 10 can be accelerated as in the second embodiment.

As described above, in the library apparatus and the method for reading makers on recording media to be accommodated in the library apparatus according to the present invention, reading processing can be performed without increasing the time for reading processing, even when different types of recording medium are used in combination. Accordingly, the present invention is suitable for the application to a library apparatus for accommodating a plurality of types of recording medium and a method for reading the markers on the recording media.

While various embodiments of the present invention have been shown and described, it should be understood that other modifications, substitutions and alternatives may be apparent to one of ordinary skill in the art. Such modifications, substitutions and alternatives can be made without departing from the spirit and scope of the invention, which should be determined from the appended claims.

What is claimed is:

1. A method for reading a marker on a recording medium in a library apparatus which can accommodate a recording medium, the method comprising:

reading a marker on the recording medium by a moving reader, the marker being a first maker and/or a second marker;

completing reading of the markers on the recording medium when read data includes the data of the first marker and the second marker;

continuing reading of the markers on the recording medium when the read data includes only the data of one of the first marker and the second marker;

calculating the time required for the optical reader to reach the position for reading the markers on the recording medium; and reading the markers on the recording medium with the optical reader after the calculated time has passed.

2. The method according to claim 1, further comprising reading the markers on the recording medium after the moving speed of the reader is decreased.

3. The method according to claim 1, wherein the first marker is a marker for indicating the volume label of the recording medium, the method further comprising determining that the volume label indicated by the first marker is the volume label of the recording medium when the read data is the data of one of the first marker and the second marker, and when only the data of the first marker is read by a predetermined number of readings of the markers on the recording medium.

4. The method according to claim 1, further comprising reading the markers on the recording medium when the recording medium is mounted in the library apparatus.

5. A library apparatus which can accommodate a recording medium, the library apparatus comprising:

a container for accommodating the recording medium having a first barcode label for indicating a volume label of the recording medium alone or the recording medium having the first barcode label and a second barcode label for indicating the type of recording medium;

an optical reader for reading the barcode labels;

an accessor which moves while carrying the optical reader; and a determination unit for determining whether the data read by the optical reader is the data of the first barcode label or the data of the second barcode label, wherein the optical reader is moved by the accessor so as to read the barcode labels on the recording medium and the determination unit determines whether the read data is the data of the first barcode label or the data of the second barcode label, reading of the barcode labels on the recording medium is completed when the data includes the data of the first barcode label and the second barcode label, and reading of the barcode labels on the recording medium is performed again when the data does not include data of both the first barcode label and the second barcode label, wherein the time required for the reader to reach the position for reading the markers on the recording medium is calculated; and the markers on the recording medium are read with the reader after the calculated time has passed.

* * * * *